United States Patent
DeRudder et al.

(10) Patent No.: US 7,723,428 B2
(45) Date of Patent: May 25, 2010

(54) POLYCARBONATE COMPOSITIONS WITH IMPROVED MOLDING CAPABILITY

(75) Inventors: James Louis DeRudder, Mt. Vernon, IN (US); Robert Puyenbroek, Bergen op Zoom (NL); Andries Adriaan Volkers, Wouw (NL)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/129,957

(22) Filed: May 30, 2008

(65) Prior Publication Data

US 2009/0036593 A1 Feb. 5, 2009

Related U.S. Application Data

(60) Provisional application No. 60/953,127, filed on Jul. 31, 2007.

(51) Int. Cl.
- C08L 69/00 (2006.01)
- C08L 35/06 (2006.01)
- C08L 55/02 (2006.01)
- C08G 64/04 (2006.01)

(52) U.S. Cl. ............... 524/537; 524/611; 524/315; 524/506; 524/612; 524/115; 525/233; 528/196

(58) Field of Classification Search ............... 524/315, 524/506, 612, 115, 525, 537, 611; 525/233; 528/196
See application file for complete search history.

(56) References Cited

U.S. PATENT DOCUMENTS

| | | | |
|---|---|---|---|
| 3,511,895 A | 5/1970 | Kydonieus et al. | |
| 3,935,291 A * | 1/1976 | Jackson | 264/331.19 |
| 3,981,944 A | 9/1976 | Okamoto et al. | |
| 4,154,775 A | 5/1979 | Axelrod | |
| 4,746,701 A | 5/1988 | Kress et al. | |
| 5,414,045 A | 5/1995 | Sue et al. | |
| 6,545,089 B1 | 4/2003 | DeRudder et al. | |
| 6,987,141 B2 | 1/2006 | Okamoto et al. | |
| 7,365,125 B2 | 4/2008 | Govaerts et al. | |
| 2004/0030044 A1 | 2/2004 | Okamoto et al. | |
| 2004/0152806 A1* | 8/2004 | Koga et al. | 524/115 |
| 2005/0234171 A1* | 10/2005 | Bos et al. | 524/315 |
| 2006/0004154 A1 | 1/2006 | DeRudder et al. | |
| 2006/0020075 A1* | 1/2006 | Basham et al. | 524/494 |
| 2006/0030647 A1* | 2/2006 | Ebeling et al. | 524/115 |
| 2007/0049706 A1 | 3/2007 | Siripurapu et al. | |
| 2007/0072960 A1 | 3/2007 | Ma et al. | |
| 2007/0072961 A1 | 3/2007 | Ma et al. | |
| 2007/0093591 A1 | 4/2007 | Ma et al. | |
| 2007/0105994 A1 | 5/2007 | Li et al. | |
| 2008/0194755 A1 | 8/2008 | DeRudder | |

OTHER PUBLICATIONS

PCT International Search Report for International Application No. PCT/US2008/069407.

* cited by examiner

*Primary Examiner*—Vasu Jagannathan
*Assistant Examiner*—Mark S Kaucher
(74) *Attorney, Agent, or Firm*—Cantor Colburn LLP

(57) ABSTRACT

A thermoplastic composition comprising a polycarbonate, a polycarbonate-polysiloxane copolymer, an impact modifier composition comprising ABS or BABS, a second impact modifier different from BABS or ABS, and an aromatic vinyl copolymer is disclosed. The thermoplastic composition has improved molding capability.

22 Claims, 3 Drawing Sheets

POLYCARBONATE COMPOSITIONS WITH IMPROVED MOLDING CAPABILITY

CROSS REFERENCE TO RELATED APPLICATIONS

This application claims priority from U.S. Provisional Application Ser. No. 60/953,127, filed Jul. 31, 2007.

BACKGROUND

This invention is directed to thermoplastic compositions having improved molding capability.

Injection molding provides a convenient way for preparing various articles from thermoplastic resins, particularly objects of a relatively intricate nature. In order to injection mold articles in an economic manner the mold resident cycle time should be kept to a minimum. This shorter cycle time provides a shorter resin heat period with consequently less thermal damage to the resin itself and/or less thermal promoted interaction between the resin and various additives present in the resin. In order to accomplish a release of the resin from the mold, various mold release agents have been found which provide for a release of the resin with lower ejection pressure. Such agents should be chemically compatible with the resin as measured by the usual characteristics of the resin under normal conditions and heat treatments.

Of the thermoplastic resins which find a mold release agent useful from time to time are polycarbonate, copolyestercarbonate and blends of these resins with other thermoplastic resins and impact modifiers. As a result of the generally high temperature which these thermoplastics are subjected to during molding and the inherent sensitivity of these resins to chemical attack and degradation by additives which are often compatible with many other thermoplastics, it is necessary to select mold release agents with high temperature stability and compatibility with polycarbonates.

With molded parts, and particularly injection molded parts, it is very important to be able to eject the part from the mold without damaging the part, while at the same time, maintaining the efficiency and cycle time. To reduce or minimize cycle times, many manufacturers are removing parts at hotter temperatures (that is, not letting them cool as long). Since the temperature is hotter, the part has a tendency to stick more easily in the mold, or become distorted as it is ejected from the mold, since the thermoplastic material is not as stiff as if it were allowed to cool longer. In addition, many parts are becoming more complex as manufacturers try to combine multiple parts into one larger and/or more complex part having more detail and often more potential areas to stick in the mold. Therefore, it is very important to have a thermoplastic material and a combination of mold release agents that allows for the part to be ejected at lower pressures or minimal force without cracking or other part deformation.

There accordingly remains a need in the art for thermoplastic compositions comprising polycarbonates, as well as impact modified polycarbonate blends, having improved molding capability, a good flow and impact balance, and mold release.

SUMMARY OF THE INVENTION

The above needs are met by a thermoplastic composition comprising polycarbonate, a polycarbonate-polysiloxane copolymer, an impact modifier composition comprising bulk ABS and a second impact modifier, an aromatic vinyl copolymer, and optionally, a combination of mold release additives.

In other embodiments, a thermoplastic composition comprises a polycarbonate, optionally a polycarbonate-polysiloxane copolymer, optionally an impact modifier or impact modifier composition, optionally an aromatic vinyl copolymer, and a combination of at least three mold release additives.

In an embodiment, a thermoplastic composition comprises a thermoplastic composition comprising from 65 to 80 wt. % of a polycarbonate, from 2 to 10 wt. % of a polycarbonate-polysiloxane copolymer, from 15 to 25 wt. % an impact modifier composition comprising ABS or BABS and a second impact modifier different from BABS or ABS, from 1 to 10 wt. % of an aromatic vinyl copolymer, and from 1 to 3 wt. % total of a combination of at least three different mold release additives, wherein a molded sample of the thermoplastic composition has better cracking performance compared to a sample of the same thermoplastic composition without the combination of three mold release additives.

In another embodiment, a thermoplastic composition comprises from 65 to 80 wt. % of a polycarbonate, from 2 to 10 wt. % of a polycarbonate-polysiloxane copolymer, from 15 to 25 wt. % an impact modifier composition comprising ABS or BABS and a second impact modifier different from BABS or ABS, from 1 to 10 wt. % of an aromatic vinyl copolymer, and from 1 to 3 wt. % total of a combination of at least three different mold release additives, wherein a molded sample of the thermoplastic composition has lower ejection pressure from the mold compared to a sample of the same thermoplastic composition without the three mold release additives.

In another embodiment, a thermoplastic composition comprises a polycarbonate, and from 1 to 3 wt. % total, based on 100 wt. % of the polycarbonate, of a combination of at least three different mold release additives, wherein a molded sample of the thermoplastic composition has lower ejection pressure from the mold compared to a sample of the same thermoplastic composition without the three mold release additives.

In another embodiment, a thermoplastic composition comprises from 65 to 80 wt. % of a polycarbonate, from 2 to 10 wt. % of a polycarbonate-polysiloxane copolymer, from 15 to 25 wt. % an impact modifier composition comprising ABS or BABS and a second impact modifier different from BABS or ABS, and from 1 to 10 wt. % of an aromatic vinyl copolymer, wherein the thermoplastic composition, when molded and tested according to ISO 180 at −30° C., has a notched Izod impact of at least 40 kJ/m$^2$.

In another embodiment, an article comprises the above thermoplastic composition.

In still another embodiment, a method of manufacture of an article comprises molding, extruding, or shaping the above thermoplastic composition.

BRIEF DESCRIPTION OF THE FIGURE

The following is a brief description of the drawings, which are presented for the purposes of illustrating the exemplary embodiments disclosed herein and not for the purposes of limiting the same.

DETAILED DESCRIPTION OF THE INVENTION

Figure 1:
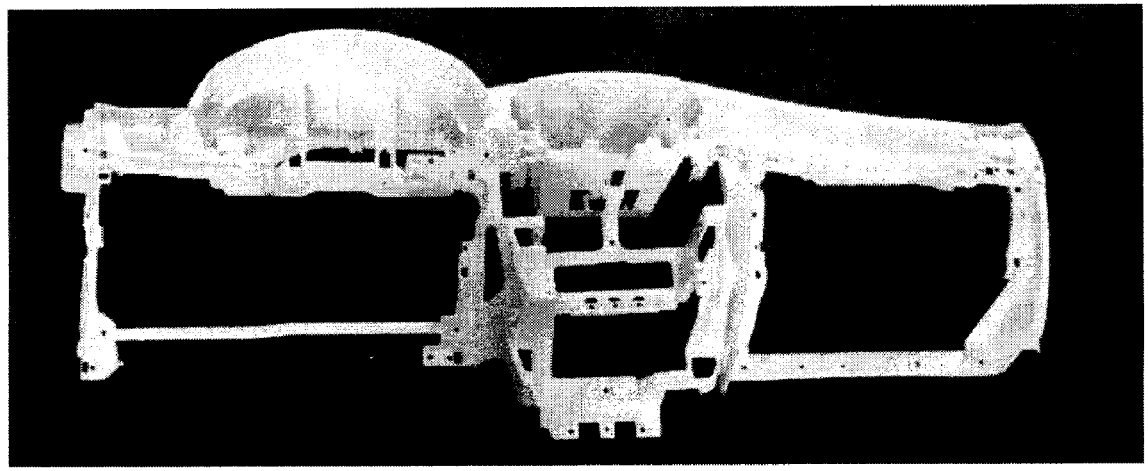
FIG. 1 is a picture of an injection molded complex instrument panel for an automobile.
Figure 2:
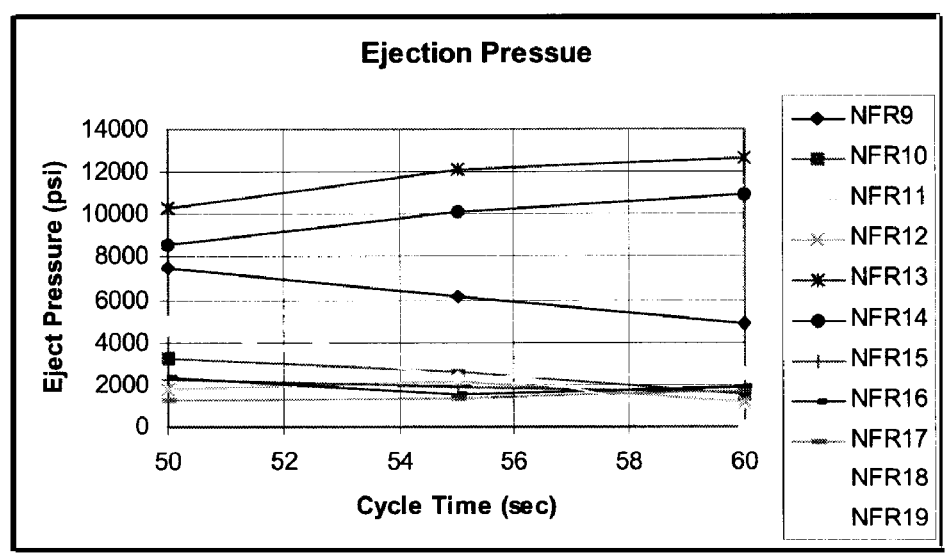
FIG. 2 is a plot of the cycle time vs the ejection pressure for the samples in Table 6 and the data in Table 7.
Figure 3:
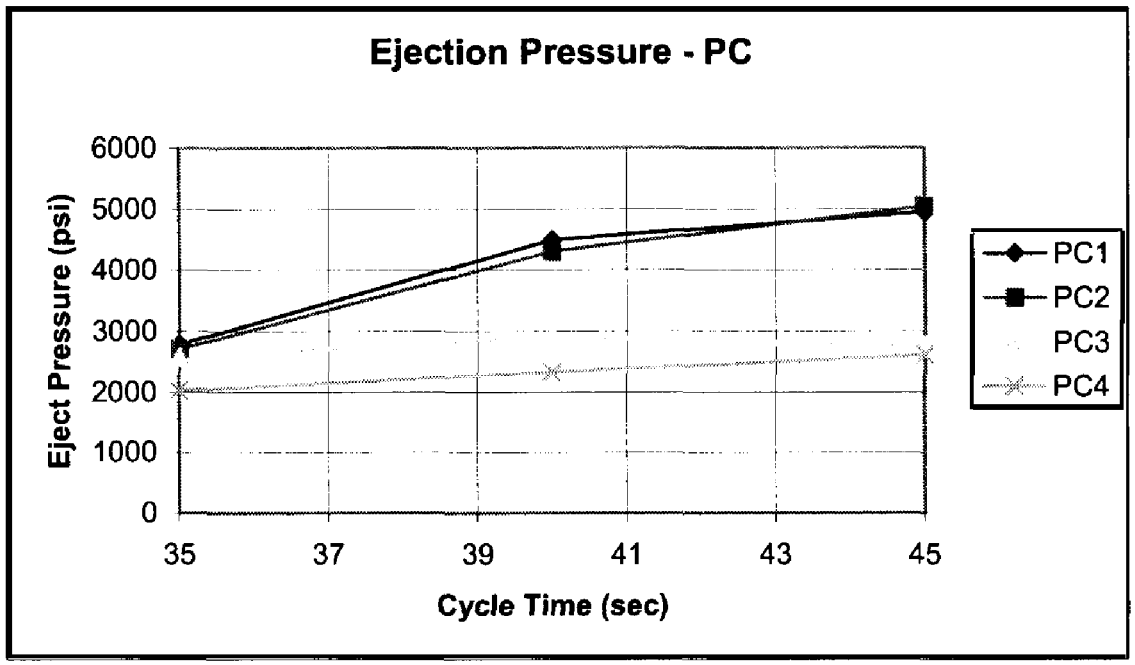
FIG. 3 is a plot of the cycle time vs the ejection pressure for the samples in Table 4 and the data in Table 5.
Figure 4:
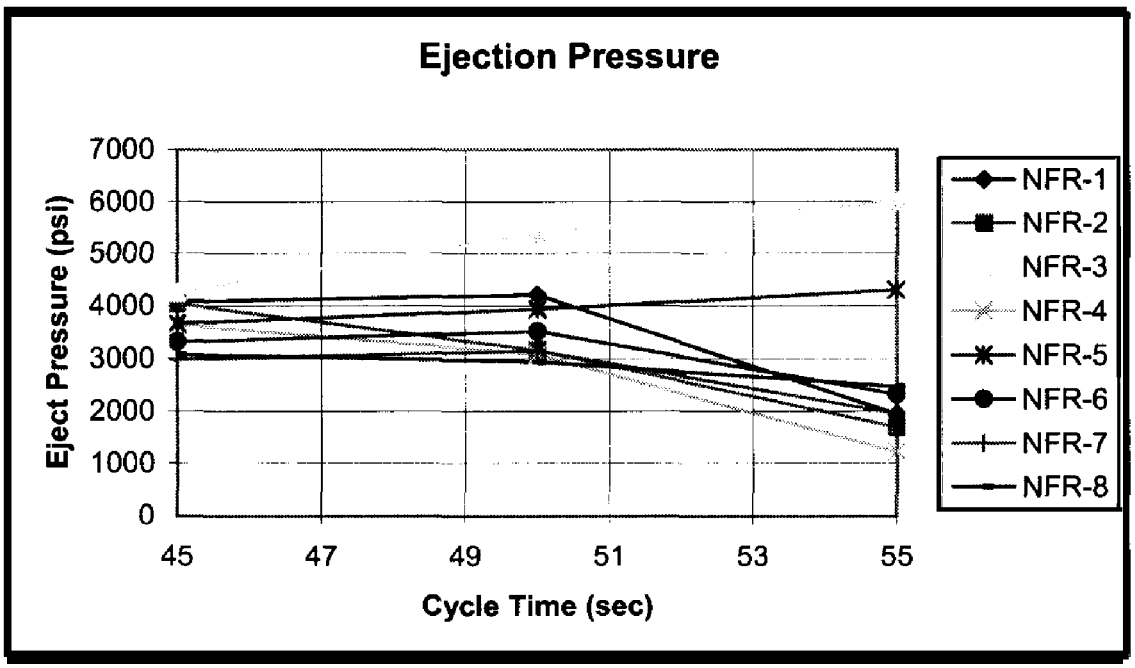
FIG. 4 is a plot of the cycle time vs the ejection pressure for the samples in Table 8 and the data in Table 9.
Figure 5:
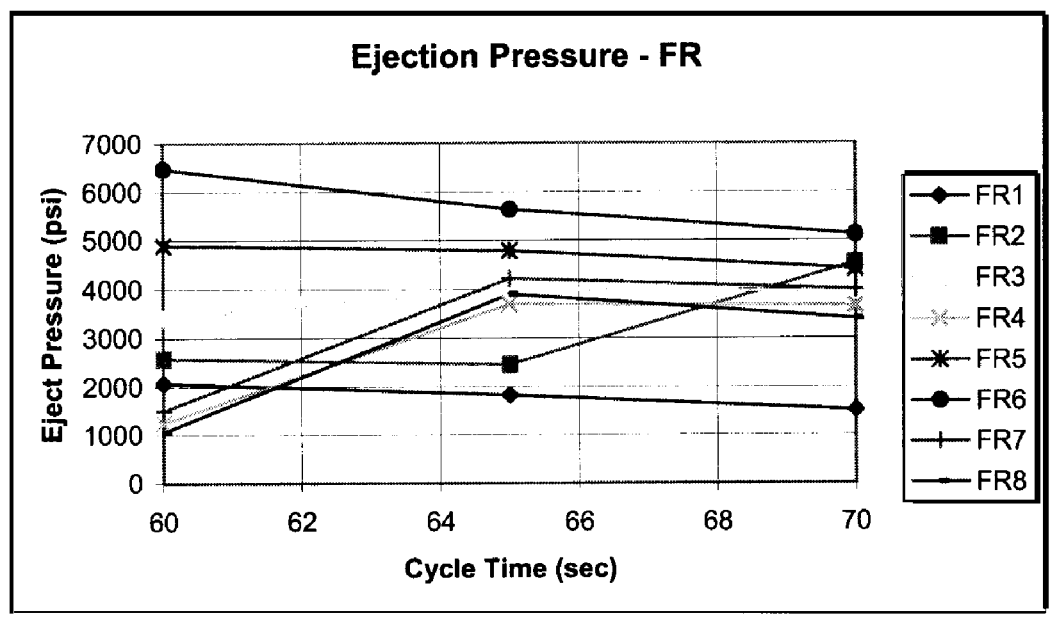
FIG. 5 is a plot of the cycle time vs the ejection pressure for the samples in Table 10 and the data in Table 11.

Surprisingly, it has been found that a thermoplastic composition comprising a polycarbonate, a polycarbonate-polysiloxane copolymer, an impact modifier composition comprising bulk ABS and a second impact modifier, an aromatic vinyl copolymer, and optionally, a combination of mold release additives, and in some embodiments, at least three mold release additives, has excellent mechanical properties, in addition to improved molding capability.

In an embodiment, a thermoplastic composition comprises a thermoplastic composition comprising from 65 to 80 wt. % of a polycarbonate, from 2 to 10 wt. % of a polycarbonate-polysiloxane copolymer, from 15 to 25 wt. % an impact modifier composition comprising ABS or BABS and a second impact modifier different from BABS or ABS, from 1 to 10 wt. % of an aromatic vinyl copolymer, and from 1 to 3 wt. % total of a combination of at least three different mold release additives, wherein a molded sample of the thermoplastic composition has better cracking performance compared to a sample of the same thermoplastic composition without the combination of three mold release additives.

In an embodiment, the second impact modifier is MBS. In another embodiment, the aromatic vinyl copolymer is SAN. In another embodiment, the mold release additives are each present in equal amounts, and further molded sample of the thermoplastic composition has lower ejection pressure from the mold compared to a sample of the same thermoplastic composition without the three mold release additives. In an embodiment, the thermoplastic composition further comprises a flame retardant additive.

In another embodiment, A thermoplastic composition comprises from 65 to 80 wt. % of a polycarbonate, from 2 to 10 wt. % of a polycarbonate-polysiloxane copolymer, from 15 to 25 wt. % an impact modifier composition comprising ABS or BABS and a second impact modifier different from BABS or ABS, from 1 to 10 wt. % of an aromatic vinyl copolymer, and from 1 to 3 wt. % total of a combination of at least three different mold release additives, wherein a molded sample of the thermoplastic composition has lower ejection pressure from the mold compared to a sample of the same thermoplastic composition without the three mold release additives.

In some embodiments, the second impact modifier is MBS and the aromatic vinyl copolymer is SAN. In some embodiments, the polycarbonate-polysiloxane copolymer is present in an amount from 4 to 8 wt. %, and wherein the aromatic vinyl copolymer is present in an amount of from 2 to 8 wt. %.

In another embodiment, a thermoplastic composition comprises a polycarbonate, and from 1 to 3 wt. % total, based on 100 wt. % of the polycarbonate, of a combination of at least three different mold release additives, wherein a molded sample of the thermoplastic composition has lower ejection pressure from the mold compared to a sample of the same thermoplastic composition without the three mold release additives.

In another embodiment, a thermoplastic composition comprises from 65 to 80 wt. % of a polycarbonate, from 2 to 10 wt. % of a polycarbonate-polysiloxane copolymer, from 15 to 25 wt. % an impact modifier composition comprising ABS or BABS and a second impact modifier different from BABS or ABS, and from 1 to 10 wt. % of an aromatic vinyl copolymer, wherein the thermoplastic composition, when molded and tested according to ISO 180 at −30° C., has a notched Izod impact of at least 40 kJ/m$^2$. In some embodiments, the thermoplastic composition, when molded and tested according to ISO 180 at −30° C., has a notched Izod impact of at least 45 kJ/m$^2$.

In some embodiments, the polycarbonate is present in an amount of from about 50 to about 99.5 wt. %, optionally from about 60 to about 99.5 wt. %, and in some embodiments, from about 65 to about 80 wt. %. In some embodiments, the polycarbonate-polysiloxane copolymer is present in amounts of from about 0 to about 15 wt. %, optionally from about 2 to about 10 wt. %, and in some embodiments, from about 4 to about 8 wt. %. In some embodiments, the impact modifier (or impact modifiers) is present in an amount of from about 0 to about 35 wt. %, optionally from about 15 to about 25 wt. %, and in some embodiments, more than one impact modifier is present. In some embodiments, the impact modifier comprises a combination of ABS or BABS and a second impact modifier different from the ABS or BABS. In some embodiments, the ABS or BABS is present in an amount of from 15 to 25 wt. %, and the second impact modifier is present in an amount of from 1 to 10 wt. %. In some embodiments, the second impact modifier is MBS. In some embodiments, the rigid copolymer is present in amounts of from about 0 to about 15 wt. %, optionally from about 1 to about 10 wt. %, and in some embodiments, from about 2 to about 8 wt. %. In some embodiments, the mold release additive or additives is present in amounts of from about 0 to about 5 wt. %, optionally from about 0.5 to about 5 wt. %, and in some embodiments, from about 1 to about 3 wt. %. In some embodiments, the mold release additives are present in equal amounts.

In another embodiment, an article comprises the thermoplastic composition. The article may be a molded article, such as an injection molded article or a blow molded article, or an extruded article, or other article as known in the art.

As used herein, the terms "polycarbonate" and "polycarbonate resin" means compositions having repeating structural carbonate units of formula (1):

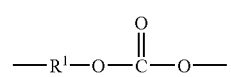

(1)

in which at least about 60 percent of the total number of R$^1$ groups are aromatic organic radicals and the balance thereof are aliphatic, alicyclic, or aromatic radicals. In one embodiment each R$^1$ is an aromatic organic radical and, more specifically, a radical of formula (2):

wherein each of A$^1$ and A$^2$ is a monocyclic divalent aryl radical and Y$^1$ is a bridging radical having one or two atoms that separate A$^1$ from A$^2$. In an exemplary embodiment, one atom separates A$^1$ from A$^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical Y$^1$ may be a hydrocarbon group or a saturated hydrocarbon group such as methylene, cyclohexylidene, or isopropylidene.

Polycarbonates may be produced by the interfacial reaction of dihydroxy compounds having the formula HO—R$^1$—OH, which includes dihydroxy compounds of formula (3)

(3)

wherein $Y^1$, $A^1$ and $A^2$ are as described above. Also included are bisphenol compounds of general formula (4):

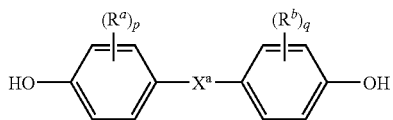

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

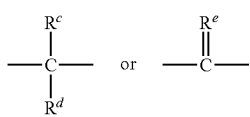

(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, alkyl-substituted hydroquinone such as methylhydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like. Combinations comprising at least one of the foregoing dihydroxy compounds may also be used.

A nonexclusive list of specific examples of the types of bisphenol compounds that may be represented by formula (3) includes 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing bisphenol compounds may also be used.

Branched polycarbonates are also useful, as well as blends comprising a linear polycarbonate and a branched polycarbonate. The branched polycarbonates may be prepared by adding a branching agent during polymerization, for example a polyfunctional organic compound containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of about 0.05-2.0 wt. %. All types of polycarbonate end groups are contemplated as being useful in the polycarbonate composition, provided that such end groups do not significantly affect desired properties of the thermoplastic compositions.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, and the like) or a glycol (e.g., the bishaloformate of ethylene glycol, neopentyl glycol, polyethylene glycol, and the like). Combinations comprising at least one of the foregoing types of carbonate precursors may also be used.

Among the exemplary phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$ wherein X is Cl$^-$, Br$^-$, a $C_{1-8}$ alkoxy group or $C_{6-18}$ aryloxy group. An effective amount of a phase transfer catalyst may be about 0.1 to about 10 wt. % based on the weight of bisphenol in the phosgenation mixture. In another embodiment an effective amount of phase transfer catalyst may be about 0.5 to about 2 wt. % based on the weight of bisphenol in the phosgenation mixture.

Alternatively, melt processes may be used. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst. Volatile monohydric phenol is removed from the molten reactants by distillation and the polymer is isolated as a molten residue.

In one specific embodiment, the polycarbonate is a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of about 0.3 to about 1.5 deciliters per gram (dl/gm), specifically about 0.45 to about 1.0 dl/gm. The polycarbonates may have a weight average molecular weight of about 10,000 to about 200,000, specifically about 20,000 to about 100,000 as measured by gel permeation chromatography. The polycarbonates are substantially free of impurities, residual acids, residual bases, and/or residual metals that may catalyze the hydrolysis of polycarbonate.

"Polycarbonate" and "polycarbonate resin" as used herein further includes copolymers comprising carbonate chain units together with a different type of chain unit. Such copolymers may be random copolymers, block copolymers, dendrimers and the like. One specific type of copolymer that may be used is a polyester carbonate, also known as a copolyester-polycarbonate. Such copolymers further contain, in addition to recurring carbonate chain units of the formula (1), repeating units of formula (6)

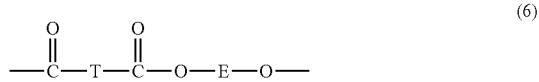

(6)

wherein E is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, E is a $C_{2-6}$ alkylene radical. In another embodiment, E is derived from an aromatic dihydroxy compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. The halogen is preferably bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluororesorcinol, 2,4,5,6-tetrabromo resorcinol, and the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluorohydroquinone, 2,3,5,6-tetrabromo hydroquinone, and the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, E is a $C_{2-6}$ alkylene radical and T is p-phenylene, m-phenylene, naphthalene, a divalent cycloaliphatic radical, or a mixture thereof. This class of polyester includes the poly(alkylene terephthalates).

The copolyester-polycarbonate resins are also prepared by interfacial polymerization. Rather than using the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, and mixtures thereof, it is possible to employ isophthaloyl dichloride, terephthaloyl dichloride, and mixtures thereof. The copolyester-polycarbonate resins may have an intrinsic viscosity, as determined in chloroform at 25° C., of about 0.3 to about 1.5 deciliters per gram (dl/gm), specifically about 0.45 to about 1.0 dl/gm. The copolyester-polycarbonate resins may have a weight average molecular weight of about 10,000 to about 200,000, specifically about 20,000 to about 100,000 as measured by gel permeation chromatography. The copolyester-polycarbonate resins are substantially free of impurities, residual acids, residual bases, and/or residual metals that may catalyze the hydrolysis of polycarbonate.

The polycarbonate component may further comprise, in addition to the polycarbonates described above, combinations of the polycarbonates with other thermoplastic polymers, for example combinations of polycarbonate homopolymers and/or copolymers with polyesters and the like. As used herein, a "combination" is inclusive of all mixtures, blends, alloys, and the like. Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end-use of the composition.

In one embodiment, poly(alkylene terephthalates) are used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated herein are the above polyesters with a minor amount, e.g., from about 0.5 to about 10 percent by weight, of units derived from an aliphatic diacid and/or an aliphatic polyol to make copolyesters.

The blends of a polycarbonate and a polyester may comprise about 10 to about 99 wt. % polycarbonate and correspondingly about 1 to about 90 wt. % polyester, in particular a poly(alkylene terephthalate). In one embodiment, the blend comprises about 30 to about 70 wt. % polycarbonate and correspondingly about 30 to about 70 wt. % polyester. The foregoing amounts are based on the combined weight of the polycarbonate and polyester.

The thermoplastic composition further includes a combination of two or more impact modifiers, optionally two or more impact modifiers that do not catalyze hydrolytic degradation of polycarbonate. An impact modifier composition comprising bulk polymerized ABS and MBS, as described in U.S. Publication No. 2006-0004154-A1, would be an example of this combination of impact modifiers.

The bulk polymerized ABS comprises an elastomeric phase comprising (i) butadiene and having a Tg of less than about 10° C., and (ii) a rigid polymeric phase having a Tg of greater than about 15° C. and comprising a copolymer of a monovinylaromatic monomer such as styrene and an unsaturated nitrile such as acrylonitrile. Such ABS polymers may be prepared by first providing the elastomeric polymer, then polymerizing the constituent monomers of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Polybutadiene homopolymer may be used as the elastomer phase. Alternatively, the elastomer phase of the bulk polymerized ABS comprises butadiene copolymerized with up to about 25 wt. % of another conjugated diene monomer of formula (8):

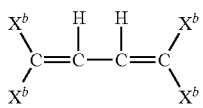

(8)

wherein each $X^b$ is independently $C_1$-$C_5$ alkyl. Examples of conjugated diene monomers that may be used are isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. A specific conjugated diene is isoprene.

The elastomeric butadiene phase may additionally be copolymerized with up to 25 wt %, specifically up to about 15 wt. %, of another comonomer, for example monovinylaromatic monomers containing condensed aromatic ring structures such as vinyl naphthalene, vinyl anthracene and the like, or monomers of formula (9):

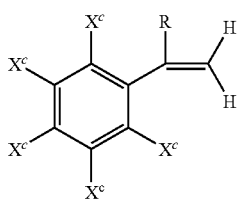

(9)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers copolymerizable with the butadiene include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing monovinylaromatic monomers. In one embodiment, the butadiene is copolymerized with up to about 12 wt. %, specifically about 1 to about 10 wt. % styrene and/or alpha-methyl styrene.

Other monomers that may be copolymerized with the butadiene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (10):

(10)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, and the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the butadiene.

The particle size of the butadiene phase is not critical, and may be, for example about 0.01 to about 20 micrometers, specifically about 0.5 to about 10 micrometers, more specifically about 0.6 to about 1.5 micrometers may be used for bulk polymerized rubber substrates. Particle size may be measured by light transmission methods or capillary hydrodynamic chromatography (CHDF). The butadiene phase may provide about 5 to about 95 wt. % of the total weight of the ABS impact modifier copolymer, more specifically about 20 to about 90 wt. %, and even more specifically about 40 to about 85 wt. % of the ABS impact modifier, the remainder being the rigid graft phase.

The rigid graft phase comprises a copolymer formed from a styrenic monomer composition together with an unsaturated monomer comprising a nitrile group. As used herein, "styrenic monomer" includes monomers of formula (9) wherein each $X^c$ is independently hydrogen, $C_1$-$C_4$ alkyl, phenyl, $C_7$-$C_9$ aralkyl, $C_7$-$C_9$ alkaryl, $C_1$-$C_4$ alkoxy, phenoxy, chloro, bromo, or hydroxy, and R is hydrogen, $C_1$-$C_2$ alkyl, bromo, or chloro. Specific examples styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like. Combinations comprising at least one of the foregoing styrenic monomers may be used.

Further as used herein, an unsaturated monomer comprising a nitrile group includes monomers of formula (10) wherein R is hydrogen, $C_1$-$C_5$ alkyl, bromo, or chloro, and $X^c$ is cyano. Specific examples include acrylonitrile, ethacrylonitrile, methacrylonitrile, alpha-chloroacrylonitrile, beta-chloroacrylonitrile, alpha-bromoacrylonitrile, and the like. Combinations comprising at least one of the foregoing monomers may be used.

The rigid graft phase of the bulk polymerized ABS may further optionally comprise other monomers copolymerizable therewith, including other monovinylaromatic monomers and/or monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (10). Specific comonomers include $C_1$-$C_4$ alkyl(meth)acrylates, for example methyl methacrylate.

The rigid copolymer phase will generally comprise about 10 to about 99 wt. %, specifically about 40 to about 95 wt. %, more specifically about 50 to about 90 wt. % of the styrenic monomer; about 1 to about 90 wt. %, specifically about 10 to about 80 wt. %, more specifically about 10 to about 50 wt. % of the unsaturated monomer comprising a nitrile group; and 0 to about 25 wt. %, specifically 1 to about 15 wt. % of other comonomer, each based on the total weight of the rigid copolymer phase.

The bulk polymerized ABS copolymer may further comprise a separate matrix or continuous phase of ungrafted rigid copolymer that may be simultaneously obtained with the ABS. The ABS may comprise about 40 to about 95 wt. % elastomer-modified graft copolymer and about 5 to about 65 wt. % rigid copolymer, based on the total weight of the ABS. In another embodiment, the ABS may comprise about 50 to about 85 wt. %, more specifically about 75 to about 85 wt. % elastomer-modified graft copolymer, together with about 15 to about 50 wt. %, more specifically about 15 to about 25 wt. % rigid copolymer, based on the total weight of the ABS.

A variety of bulk polymerization methods for ABS-type resins are known. In multizone plug flow bulk processes, a series of polymerization vessels (or towers), consecutively connected to each other, providing multiple reaction zones. The elastomeric butadiene may be dissolved in one or more of the monomers used to form the rigid phase, and the elastomer solution is fed into the reaction system. During the reaction, which may be thermally or chemically initiated, the elastomer is grafted with the rigid copolymer (i.e., SAN). Bulk copolymer (referred to also as free copolymer, matrix copolymer, or non-grafted copolymer) is also formed within the continuous phase containing the dissolved rubber. As polymerization continues, domains of free copolymer are formed within the continuous phase of rubber/comonomers to provide a two-phase system. As polymerization proceeds, and more free copolymer is formed, the elastomer-modified copolymer starts to disperse itself as particles in the free copolymer and the free copolymer becomes a continuous phase (phase inversion). Some free copolymer is generally occluded within the elastomer-modified copolymer phase as well. Following the phase inversion, additional heating may be used to complete polymerization. Numerous modifications of this basis process have been described, for example in U.S. Pat. No. 3,511,895, which describes a continuous bulk ABS process that provides controllable molecular weight distribution and microgel particle size using a three-stage reactor system. In the first reactor, the elastomer/monomer solution is charged into the reaction mixture under high agitation to precipitate discrete rubber particle uniformly throughout the reactor mass before appreciable cross-linking can occur. Solids levels of the first, the second, and the third reactor are carefully controlled so that molecular weights fall into a desirable range. U.S. Pat. No. 3,981,944 discloses extraction of the elastomer particles using the styrenic monomer to dissolve/disperse the elastomer particles, prior to addition of the unsaturated monomer comprising a nitrile group and any other comonomers. U.S. Pat. No. 5,414,045 discloses reacting in a plug flow grafting reactor a liquid feed composition comprising a styrenic monomer composition, an unsaturated nitrile monomer composition, and an elastomeric butadiene polymer to a point prior to phase inversion, and reacting the first polymerization product (grafted elastomer) therefrom in a continuous-stirred tank reactor to yield a phase inverted second polymerization product that then can be further reacted in a finishing reactor, and then devolatilized to produce the desired final product.

In addition to the bulk polymerized ABS (also referred to as "Bulk ABS or BABS"), the impact modifier composition comprises an additional impact modifier that is different from the Bulk ABS. Examples of impact modifiers that are different from the Bulk ABS include elastomer-modified graft copolymers comprising (i) an elastomeric (i.e., rubbery) polymer substrate having a Tg less than about 10° C., more specifically less than about –10° C., or more specifically about –40° to –80° C., and (ii) a rigid polymeric superstrate grafted to the elastomeric polymer substrate. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers.

Suitable conjugated diene monomers for preparing the elastomer phase are of formula (8) above wherein each $X^b$ is independently hydrogen, $C_1$-$C_5$ alkyl, and the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (9) above, wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, combinations comprising at least one of the foregoing compounds, and the like. Styrene and/or alpha-methylstyrene are commonly used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (10) wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, and the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl(meth)acrylate, ethyl (meth)acrylate, n-butyl (meth)acrylate, t-butyl(meth)acrylate, n-propyl(meth)acrylate, isopropyl (meth)acrylate, 2-ethylhexyl(meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Certain (meth)acrylate monomers may also be used to provide the elastomer phase, including cross-linked, particulate emulsion homopolymers or copolymers of $C_{1-16}$ alkyl (meth)acrylates, specifically $C_{1-9}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-16}$ alkyl (meth)acrylate monomers may optionally be polymerized in admixture with up to 15 wt. % of comonomers of generic formulas (8), (9), or (10) as broadly described above. Exemplary comonomers include but are not limited to butadiene, isoprene, styrene, methyl methacrylate, phenyl methacrylate, phenethylmethacrylate, N-cyclohexylacrylamide, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. The elastomer phase may be a particulate, moderately cross-linked copolymer derived from conjugated butadiene or $C_{4-9}$ alkyl acrylate rubber, and preferably has a gel content greater than 70%. Also suitable are copolymers derived from mixtures of butadiene with styrene, acrylonitrile, and/or $C_{4-6}$ alkyl acrylate rubbers.

The elastomeric phase may provide about 5 to about 95 wt. % of the elastomer-modified graft copolymer, more specifically about 20 to about 90 wt. %, and even more specifically about 40 to about 85 wt. %, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above broadly described monovinylaromatic monomers of formula (9) may be used in the rigid graft phase, including styrene, alpha-methyl styrene, halostyrenes such as dibromostyrene, vinyltoluene, vinylxylene, butylstyrene, para-hydroxystyrene, methoxystyrene, and the like, or combinations comprising at least one of the foregoing monovinylaromatic monomers. Suitable comonomers include, for example, the above broadly described monovinylic monomers and/or monomers of the general formula (10). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include acrylonitrile, ethacrylonitrile, methacrylonitrile, methyl (meth) acrylate, ethyl (meth)acrylate, n-propyl (meth)acrylate, isopropyl (meth)acrylate, and the like, and combinations comprising at least one of the foregoing comonomers.

In one specific embodiment, the rigid graft phase is formed from styrene or alpha-methyl styrene copolymerized with ethyl acrylate and/or methyl methacrylate. In other specific embodiments, the rigid graft phase is formed from styrene copolymerized with; styrene copolymerized with methyl methacrylate; and styrene copolymerized with methyl methacrylate and acrylonitrile.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt. % of monovinyl aromatic monomer, specifically about 30 to about 100 wt. %, more specifically about 50 to about 90 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the additional elastomer-modified graft copolymer. Typically, such impact modifiers comprise about 40 to about 95 wt. % elastomer-modified graft copolymer and about 5 to about 65 wt. % rigid (co)polymer, based on the total weight of the impact modifier. In another embodiment, such impact modifiers comprise about 50 to about 85 wt. %, more specifically about 75 to about 85 wt. % rubber-modified rigid copolymer, together with about 15 to about 50 wt. %, more specifically about 15 to about 25 wt. % rigid (co)polymer, based on the total weight of the impact modifier.

Specific examples of elastomer-modified graft copolymers that differ from the bulk polymerized ABS include but are not limited to acrylonitrile-styrene-butyl acrylate (ASA), methyl methacrylate-acrylonitrile-butadiene-styrene (MABS), methyl methacrylate-butadiene-styrene (MBS), and acrylonitrile-ethylene-propylene-diene-styrene (AES). The MBS resins may be prepared by emulsion polymerization of methacrylate and styrene in the presence of polybutadiene as is described in U.S. Pat. No. 6,545,089, which process is summarized below. In an embodiment, the second impact modifier is MBS.

Optionally, another specific type of elastomer-modified impact modifier may be used, which comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_9$ linear or branched hydrocarbyl group and $R^e$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (9) or (10), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, and the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and an tetraethoxyorthosilicate may be reacted with a first graft link monomer such as (gamma-methacryloxypropyl)methyldimethoxysilane, to afford silicone rubber having an average particle size from about 100 nanometers to about 2 microns. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

In practice, any of the above described impact modifiers, or combinations of one or more of the foregoing impact modifiers, may be used. Processes for the formation of the elastomer-modified graft copolymers include mass, emulsion, suspension, and solution processes, or combined processes such as bulk-suspension, emulsion-bulk, bulk-solution or other techniques, using continuous, semibatch, or batch processes. Such processes may be conducted so as to avoid the use or production of any species that degrade polycarbonates, if desired, and/or to provide the additional impact modifiers with the desired pH.

In one embodiment, the second impact modifier (or impact modifiers, if desired) is prepared by an emulsion polymerization process that avoids the use or production of any species that degrade polycarbonates. In another embodiment the impact modifier is prepared by an emulsion polymerization process that is essentially free of basic species, for example species such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as polymerization aids, e.g., surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and combinations comprising at least one of the foregoing surfactants. A specific surfactant is a $C_{6-16}$, specifically a $C_{8-12}$ alkyl sulfonate. This emulsion polymerization process is known in the art and is described, for example, in U.S. Pat. No. 6,545,089.

The composition further comprises a polycarbonate-polysiloxane copolymer comprising polycarbonate blocks and polydiorganosiloxane blocks. The polycarbonate blocks in the copolymer comprise repeating structural units of formula (1) as described above, for example wherein $R^1$ is of formula (2) as described above. These units may be derived from reaction of dihydroxy compounds of formula (3) as described above. In one embodiment, the dihydroxy compound is bisphenol A, in which each of $A^1$ and $A^2$ is p-phenylene and $Y^1$ is isopropylidene.

The polydiorganosiloxane blocks comprise repeating structural units of formula (11) (sometimes referred to herein as 'siloxane'):

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer.

The value of D in formula (11) may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (12):

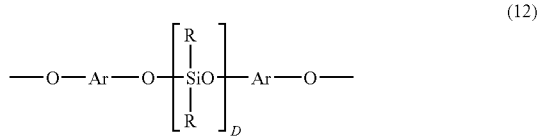

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (12) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Such units may be derived from the corresponding dihydroxy compound of the following formula:

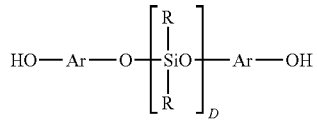

wherein Ar and D are as described above. Such compounds are further described in U.S. Pat. No. 4,746,701 to Kress et al. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (13)

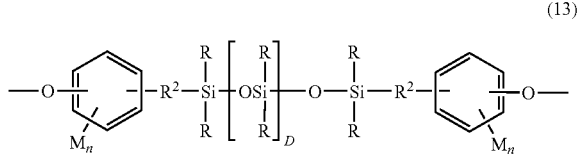

wherein R and D are as defined above. $R^2$ in formula (13) is a divalent $C_2$-$C_8$ aliphatic group. Each M in formula (13) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (14):

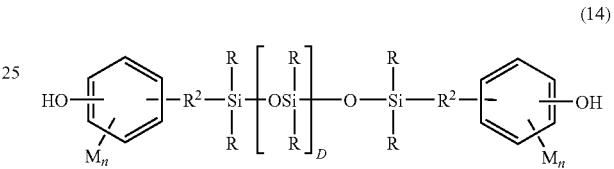

wherein R, D, M, $R^2$, and n are as described above.

Such dihydroxy polysiloxanes can be made by effecting a platinum catalyzed addition between a siloxane hydride of the formula (15),

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polycarbonate-polysiloxane copolymer may be manufactured by reaction of diphenolic polysiloxane (14) with a carbonate source and a dihydroxy aromatic compound of formula (3), optionally in the presence of a phase transfer catalyst as described above. Suitable conditions are similar to those useful in forming polycarbonates. For example, the copolymers are prepared by phosgenation, at temperatures from below 0° C. to about 100° C., preferably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, that is, may be about 1 wt. % to about 99 wt. % of polydimethylsiloxane, or an equivalent molar amount of another polydiorganosiloxane, with the balance being carbonate units. The particular amounts used will therefore be determined depending on desired physical properties of the thermoplastic composition, the value of D (within the range of 2 to about 1000), and the type and relative amount of each component in the thermoplastic composition, including the type and amount of polycarbonate, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising about 1 wt. % to about 75 wt. %, or about 1 wt. % to about 50 wt. % polydimethylsiloxane, or an equivalent molar amount of another polydiorganosiloxane. In one embodiment, the copolymer comprises about 5 wt. % to about 40 wt. %, optionally about 5 wt. % to about 25 wt. % polydimethylsiloxane, or an equivalent molar amount of another polydiorganosiloxane, with the balance being polycarbonate. In a particular embodiment, the copolymer may comprise about 20 wt. % siloxane.

The polycarbonate-polysiloxane copolymers have a weight-average molecular weight (MW, measured, for example, by gel permeation chromatography, ultra-centrifugation, or light scattering) of about 10,000 g/mol to about 200,000 g/mol, specifically about 20,000 g/mol to about 100,000 g/mol.

The composition further comprises an ungrafted rigid copolymer, in addition to (or separate from) any free ungrafted rigid copolymer that may be present from one or more of the impact modifiers. For example, there may be some 'free' SAN present from the Bulk ABS. In some embodiments, the rigid copolymer is an aromatic vinyl copolymer. The rigid copolymer is additional to any rigid copolymer present in the impact modifier. It may be the same as any of the rigid copolymers described above, without the elastomer modification. The rigid copolymers generally have a Tg greater than about 15° C., specifically greater than about 20° C., and include, for example, polymers derived from monovinylaromatic monomers containing condensed aromatic ring structures, such as vinyl naphthalene, vinyl anthracene and the like, or monomers of formula (9) as broadly described above, for example styrene and alpha-methyl styrene; monovinylic monomers such as itaconic acid, acrylamide, N-substituted acrylamide or methacrylamide, maleic anhydride, maleimide, N-alkyl, aryl or haloaryl substituted maleimide, glycidyl(meth)acrylates, and monomers of the general formula (10) as broadly described above, for example acrylonitrile, methyl acrylate and methyl methacrylate; and copolymers of the foregoing, for example styrene-acrylonitrile (SAN), styrene-alpha-methyl styrene-acrylonitrile, methyl methacrylate-acrylonitrile-styrene, and methyl methacrylate-styrene.

The rigid copolymer may comprise about 1 to about 99 wt. %, specifically about 20 to about 95 wt. %, more specifically about 40 to about 90 wt. % of vinylaromatic monomer, together with 1 to about 99 wt. %, specifically about 5 to about 80 wt. %, more specifically about 10 to about 60 wt. % of copolymerizable monovinylic monomers. In one embodiment the rigid copolymer is SAN, which may comprise about 50 to about 99 wt. % styrene, with the balance acrylonitrile, specifically about 60 to about 90 wt. % styrene, and more specifically about 65 to about 85 wt. % styrene, with the remainder acrylonitrile.

The rigid copolymer may be manufactured by bulk, suspension, or emulsion polymerization, and is substantially free of impurities, residual acids, residual bases or residual metals that may catalyze the hydrolysis of polycarbonate. In one embodiment, the rigid copolymer is manufactured by bulk polymerization using a boiling reactor. The rigid copolymer may have a weight average molecular weight of about 50,000 to about 300,000 as measured by GPC using polystyrene standards. In one embodiment, the weight average molecular weight of the rigid copolymer is about 50,000 to about 200,000. In an embodiment, the ungrafted rigid copolymer is SAN.

In some embodiments, the thermoplastic composition further comprises a combination of mold release additives. There is considerable overlap among additives such as plasticizers, lubricants, and/or mold release agents, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; block copolymers of polyethylene oxide and polypropylene oxide, such as the Pluronic™ family of copolymers; waxes such as beeswax, montan wax, paraffin wax and the like; and poly alpha olefins such as Ethylflo™ 164, 166, 168, and 170. Such materials are generally used in amounts of about 0.1 to about 20 parts by weight, specifically about 1 to about 10 parts by weight, based on 100 parts by weight of the thermoplastic composition.

In an embodiment, a combination of three different mold release agents is used to provide optimal molding capability. In an embodiment, the combination of mold releases comprises pentaerythritol tetrastearate, a poly-alpha-olefin, and a polyethylene oxide/polypropylene oxide block copolymer. In an embodiment, the mold release agents are present in equal amounts. In other embodiments, the mold release agents are present in different amounts.

The relative amount of each component of the thermoplastic composition will depend on the particular type of polycarbonate(s) used, the presence of any other resins, and the particular impact modifier(s), including any optional rigid graft copolymer, as well as the desired properties of the composition. Particular amounts may be readily selected by one of ordinary skill in the art using the guidance provided herein.

In addition, the thermoplastic composition may include various additives such as fillers, reinforcing agents, stabilizers, and the like, with the proviso that the additives do not adversely affect the desired properties of the thermoplastic compositions.

Mixtures of additives may be used. Such additives may be mixed at a suitable time during the mixing of the components for forming the composition. Suitable fillers or reinforcing agents that may be used include, for example, silicates and silica powders such as aluminum silicate (mullite), synthetic calcium silicate, zirconium silicate, fused silica, crystalline silica graphite, natural silica sand, and the like; boron powders such as boron-nitride powder, boron-silicate powders, and the like; oxides such as $TiO_2$, aluminum oxide, magnesium oxide, and the like; calcium sulfate (as its anhydride, dihydrate or trihydrate); calcium carbonates such as chalk, limestone, marble, synthetic precipitated calcium carbonates, and the like; talc, including fibrous, modular, needle shaped, lamellar talc, and the like; wollastonite; surface-treated wollastonite; glass spheres such as hollow and solid glass spheres, silicate spheres, cenospheres, aluminosilicate (armospheres), and the like; kaolin, including hard kaolin, soft kaolin, calcined kaolin, kaolin comprising various coatings known in the art to facilitate compatibility with the polymeric matrix resin, and the like; single crystal fibers or "whiskers" such as silicon carbide, alumina, boron carbide, iron, nickel, copper, and the like; fibers (including continuous and chopped fibers) such as asbestos, carbon fibers, glass fibers, such as E, A, C, ECR, R, S, D, or NE glasses, and the like; sulfides such as molybdenum sulfide, zinc sulfide and the like; barium species such as barium titanate, barium ferrite, barium sulfate, heavy spar, and the like; metals and metal oxides such as particulate or fibrous aluminum, bronze, zinc, copper and nickel and the like; flaked fillers such as glass flakes, flaked silicon carbide, aluminum diboride, aluminum flakes, steel flakes and the like; fibrous fillers, for example short inorganic fibers such as those derived from blends comprising at least one of aluminum silicates, aluminum oxides, magnesium oxides, and calcium sulfate hemihydrate and the like; natural fillers and reinforcements, such as wood flour obtained by pulverizing wood, fibrous products such as cellulose, cotton, sisal, jute, starch, cork flour, lignin, ground nut shells, corn, rice grain husks and the like; organic fillers such as polytetrafluoroethylene (Teflon™) and the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly (vinyl alcohol) and the like; as well as additional fillers and reinforcing agents such as mica, clay, feldspar, flue dust, fillite, quartz, quartzite, perlite, tripoli, diatomaceous earth, carbon black, and the like, and combinations comprising at least one of the foregoing fillers and reinforcing agents. The fillers/reinforcing agents may be coated to prevent reactions with the matrix or may be chemically passivated to neutralize catalytic degradation site that might promote hydrolytic or thermal degradation.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber and the like. Fibrous fillers may be supplied in the form of, for example, rovings, woven fibrous reinforcements, such as 0-90 degree fabrics and the like; non-woven fibrous reinforcements such as continuous strand mat, chopped strand mat, tissues, papers and felts and the like; or three-dimensional reinforcements such as braids. Fillers are generally used in amounts of about 0 to about 150 parts by weight, based on 100 parts by weight of the thermoplastic composition.

Suitable antioxidant additives include, for example, alkylated monophenols or polyphenols; alkylated reaction products of polyphenols with dienes, such as tetrakis[methylene (3,5-di-tert-butyl-4-hydroxyhydrocinnamate)]methane, and the like; butylated reaction products of para-cresol or dicyclopentadiene; alkylated hydroquinones; hydroxylated thiodiphenyl ethers; alkylidene-bisphenols; benzyl species; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; and the like; and combinations comprising at least one of the foregoing antioxidants. Antioxidants are generally used in amounts of about 0.01 to about 1, specifically about 0.1 to about 0.5 parts by weight, based on 100 parts by weight of the thermoplastic composition.

Suitable heat and color stabilizer additives include, for example, organophosphites such as tris(2,4-di-tert-butyl phenyl)phosphite. Heat and color stabilizers are generally used in amounts of about 0.01 to about 5, specifically about 0.05 to about 0.3 parts by weight, based on 100 parts by weight of the thermoplastic composition.

Suitable secondary heat stabilizer additives include, for example thioethers and thioesters such as pentaerythritol tetrakis(3-(dodecylthio)propionate), pentaerythritol tetrakis[3-(3,5-di-tert-butyl-4-hydroxyphenyl)propionate], dilauryl thiodipropionate, distearyl thiodipropionate, dimyristyl thiodipropionate, ditridecyl thiodipropionate, pentaerythritol octylthiopropionate, dioctadecyl disulphide, and the like, and combinations comprising at least one of the foregoing heat stabilizers. Secondary stabilizers are generally used in amount of about 0.01 to about 5, specifically about 0.03 to about 0.3 parts by weight, based upon 100 parts by weight of the thermoplastic composition.

Light stabilizers, including ultraviolet light (UV) absorbing additives, may also be used. Suitable stabilizing additives of this type include, for example, benzotriazoles and hydroxybenzotriazoles such as 2-(2-hydroxy-5-methylphenyl)benzotriazole, 2-(2-hydroxy-5-tert-octylphenyl)-benzotriazole, 2-(2H-benzotriazol-2-yl)-4-(1,1,3,3-tetramethylbutyl)-phenol (CYASORB™ 5411 from Cytec), and TINUVIN™ 234 from Ciba Specialty Chemicals; hydroxybenzotriazines; hydroxyphenyl-triazine or -pyrimidine UV absorbers such as TINUVIN™ 1577 (Ciba), and 2-[4,6-bis (2,4-dimethylphenyl)-1,3,5-triazin-2-yl]-5-(octyloxy)-phenol (CYASORB™ 1164 from Cytec); non-basic hindered amine light stabilizers (hereinafter "HALS"), including substituted piperidine moieties and oligomers thereof, for example 4-piperidinol derivatives such as TINUVIN™ 622 (Ciba), GR-3034, TINUVIN™ 123, and TINUVIN™ 440; benzoxazinones, such as 2,2'-(1,4-phenylene)bis(4H-3,1-benzoxazin-4-one) (CYASORB™ UV-3638); hydroxybenzophenones such as 2-hydroxy-4-n-octyloxybenzophenone (CYASORB™ 531); oxanilides; cyanoacrylates such as 1,3-bis[(2-cyano-3,3-diphenylacryloyl)oxy]-2,2-bis[[(2-cyano-3,3-diphenylacryloyl)oxy]methyl]propane (UVINUL™ 3030) and 1,3-bis[(2-cyano-3,3-diphenylacryloyl)oxy]-2,2-bis[[(2-cyano-3,3-diphenylacryloyl)oxy]methyl]propane; and nano-size inorganic materials such as titanium oxide, cerium oxide, and zinc oxide, all with particle size less than about 100 nanometers; and the like, and combinations comprising at least one of the foregoing stabilizers. Light stabilizers may be used in amounts of about 0.01 to about 10, specifically about 0.1 to about 1 parts by weight, based on 100 parts by weight of parts by weight of the polycarbonate component and the impact modifier composition. UV absorbers are generally used in amounts of about 0.1 to about 5 parts by weight, based on 100 parts by weight of the thermoplastic composition.

Colorants such as pigment and/or dye additives may also be present. Suitable pigments include for example, inorganic pigments such as metal oxides and mixed metal oxides such as zinc oxide, titanium dioxides, iron oxides and the like; sulfides such as zinc sulfides, and the like; aluminates; sodium sulfo-silicates sulfates, chromates, and the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, and combinations comprising at least one of the foregoing pigments. Pigments may be coated to prevent reactions with the matrix or may be chemically passivated to neutralize catalytic degradation site that might promote hydrolytic or thermal degradation. Pigments are generally used in amounts of about 0.01 to about 10 parts by weight, based on 100 parts by weight of the thermoplastic composition.

Suitable dyes are generally organic materials and include, for example, coumarin dyes such as coumarin 460 (blue), coumarin 6 (green), nile red and the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, and the like; luminescent dyes such as 5-amino-9-diethyliminobenzo(a)phenoxazonium perchlorate; 7-amino-4-methylcarbostyryl; 7-amino-4-methylcoumarin; 7-amino-4-trifluoromethylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenylyl)-5-phenyl-1,3,4-oxadiazole; 2-(4-biphenyl)-6-phenylbenzoxazole-1,3; 2,5-bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 1,1'-diethyl-4,4'-carbocyanine iodide; 3,3'-diethyl-4,4',5,5'-dibenzothiatricarbocyanine iodide; 1,1'-diethyl-4,4'-dicarbocyanine iodide; 1,1'-diethyl-2,2'-dicarbocyanine iodide; 3,3'-diethyl-9,11-neopentylenethiatricarbocyanine iodide; 1,3'-diethyl-4,2'-quinolyloxacarbocyanine iodide; 1,3'-diethyl-4,2'-quinolylthiacarbocyanine iodide; 3-diethylamino-7-diethyliminophenoxazonium perchlorate; 7-diethylamino-4-methylcoumarin; 7-diethylamino-4-trifluoromethylcoumarin; 7-diethylaminocoumarin; 3,3'-diethyloxadicarbocyanine iodide; 3,3'-diethylthiacarbocyanine iodide; 3,3'-diethylthiadicarbocyanine iodide; 3,3'-diethylthiatricarbocyanine iodide; 4,6-dimethyl-7-ethylaminocoumarin; 2,2'-dimethyl-p-quaterphenyl; 2,2-dimethyl-p-terphenyl; 7-dimethylamino-1-methyl-4-methoxy-8-azaquinolone-2; 7-dimethylamino-4-methylquinolone-2; 7-dimethylamino-4-trifluoromethylcoumarin; 2-(4-(4-dimethylaminophenyl)-1,3-butadienyl)-3-ethylbenzothiazolium perchlorate; 2-(6-(p-dimethylaminophenyl)-2,4-neopentylene-1,3,5-hexatrienyl)-3-methylbenzothiazolium perchlorate; 2-(4-(p-dimethylaminophenyl)-1,3-butadienyl)-1,3,3-trimethyl-3H-indolium perchlorate; 3,3'-dimethyloxatricarbocyanine iodide; 2,5-diphenylfuran; 2,5-diphenyloxazole; 4,4'-diphenylstilbene; 1-ethyl-4-(4-(p-dimethylaminophenyl)-1,3-butadienyl)-pyridinium perchlorate; 1-ethyl-2-(4-(p-dimethylaminophenyl)-1,3-butadienyl)-pyridinium perchlorate; 1-ethyl-4-(4-(p-dimethylaminophenyl)-1,3-butadienyl)-quinolium perchlorate; 3-ethylamino-7-ethylimino-2,8-dimethylphenoxazin-5-ium perchlorate; 9-ethylamino-5-ethylamino-10-methyl-5H-benzo(a)phenoxazonium perchlorate; 7-ethylamino-6-methyl-4-trifluoromethylcoumarin; 7-ethylamino-4-trifluoromethylcoumarin; 1,1',3,3,3',3'-hexamethyl-4,4',5,5'-dibenzo-2,2'-indotricarboccyanine iodide; 1,1',3,3,3',3'-hexamethylindodicarbocyanine iodide; 1,1',3,3,3',3'-hexamethylindotricarbocyanine iodide; 2-methyl-5-t-butyl-p-quaterphenyl; N-methyl-4-trifluoromethylpiperidino-<3,2-g>coumarin; 3-(2'-N-methylbenzimidazolyl)-7-N,N-diethylaminocoumarin; 2-(1-naphthyl)-5-phenyloxazole; 2,2'-p-phenylen-bis(5-phenyloxazole); 3,5,3'''',5''''-tetra-t-butyl-p-sexiphenyl; 3,5,3'''',5''''-tetra-t-butyl-p-quinquephenyl; 2,3,5,6-1H,4H-tetrahydro-9-acetylquinolizino-<9,9a,1-gh>coumarin; 2,3,5,6-1H,4H-tetrahydro-9-carboethoxyquinolizino-<9,9a,1-gh>coumarin; 2,3,5,6-1H,4H-tetrahydro-8-methylquinolizino-<9,9a,1-gh>coumarin; 2,3,5,6-1H,4H-tetrahydro-9-(3-pyridyl)-quinolizino-<9,9a,1-gh>coumarin; 2,3,5,6-1H,4H-tetrahydro-8-trifluoromethylquinolizino-<9,9a,1-gh>coumarin; 2,3,5,6-1H,4H-tetrahydroquinolizino-<9,9a,1-gh>coumarin; 3,3',2'',3'''-tetramethyl-p-quaterphenyl; 2,5,2'''',5''''-tetramethyl-p-quinquephenyl; P-terphenyl; P-quaterphenyl; nile red; rhodamine 700; oxazine 750; rhodamine 800; IR 125; IR 144; IR 140; IR 132; IR 26; IR5; diphenylhexatriene; diphenylbutadiene; tetraphenylbutadiene; naphthalene; anthracene; 9,10-diphenylanthracene; pyrene; chrysene; rubrene; coronene; phenanthrene and the like, and combinations comprising at least one of the foregoing dyes. Dyes are generally used in amounts of about 0.1 parts per million to about 10 parts by weight, based on 100 parts by weight of the thermoplastic composition.

Monomeric, oligomeric, or polymeric antistatic additives that may be sprayed onto the article or processed into the thermoplastic composition may be advantageously used. Examples of monomeric antistatic agents include long chain esters such as glycerol monostearate, glycerol distearate, glycerol tristearate, and the like, sorbitan esters, and ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate and the like, fluorinated alkylsulfonate salts, betaines, and the like. Combinations of the foregoing antistatic agents may be used. Exemplary polymeric antistatic agents include certain polyetheresters, each containing polyalkylene glycol moieties such as polyethylene glycol, polypropylene glycol, polytetramethylene glycol, and the like. Such polymeric antistatic agents are commercially available, and include, for example PELESTAT™ 6321 (Sanyo), PEBAX™ MH1657 (Atofina), and IRGASTAT™P18 and P22 (Ciba-Geigy). Other polymeric materials that may be used as antistatic agents are inherently conducting polymers such as polythiophene (commercially available from Bayer), which retains some of its intrinsic conductivity after melt processing at elevated temperatures. In one embodiment, carbon fibers, carbon nanofibers, carbon nanotubes, carbon black or any combination of the foregoing may be used in a polymeric resin containing chemical antistatic agents to render the composition electrostatically dissipative. Antistatic agents are generally used in amounts of about 0.1 to about 10 parts by weight, specifically about based on 100 parts by weight of the thermoplastic composition.

Where a foam is desired, suitable blowing agents include, for example, low boiling halohydrocarbons and those that generate carbon dioxide; blowing agents that are solid at room temperature and when heated to temperatures higher than their decomposition temperature, generate gases such as nitrogen, carbon 25 dioxide ammonia gas, such as azodicarbonamide, metal salts of azodicarbonamide, 4,4'-oxybis(benzenesulfonylhydrazide), sodium bicarbonate, ammonium carbonate, and the like, or combinations comprising at least one of the foregoing blowing agents. Blowing agents are generally used in amounts of about 0.5 to about 20 parts by weight, based on 100 parts by weight of the thermoplastic composition.

Suitable flame retardant that may be added are stable, specifically hydrolytically stable. A hydrolytically stable flame retardant does not substantially degrade under conditions of manufacture and/or use to generate species that can catalyze or otherwise contribute to the degradation of the polycarbonate composition. Such flame retardants may be organic compounds that include phosphorus, bromine, and/or chlorine. The polysiloxane-polycarbonate copolymers described above may also be used. Non-brominated and non-chlorinated phosphorus-containing flame retardants may be preferred in certain applications for regulatory reasons, for example certain organic phosphates and/or organic compounds containing phosphorus-nitrogen bonds. Inorganic flame retardants, such as boric acid, boric oxide, or boric esters are also contemplated as effective flame retardants in these systems.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

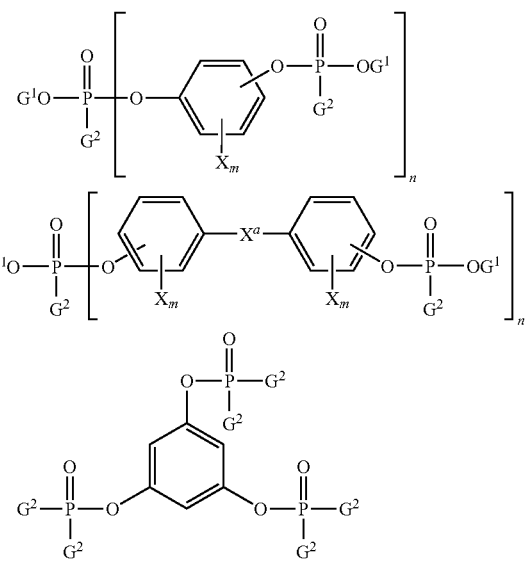

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m is 0 to 4, and n is 1 to about 30. Examples of suitable di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary suitable flame retardant compounds containing phosphorus-nitrogen bonds include phosphonitrilic chloride and tris(aziridinyl)phosphine oxide. When present, phosphorus-containing flame retardants are generally present in amounts of about 1 to about 20 parts by weight, based on 100 parts by weight of the thermoplastic composition.

Halogenated materials may also be used as flame retardants, for example halogenated compounds and resins of the formula (18):

(18)

wherein R is an alkylene, alkylidene or cycloaliphatic linkage, such as methylene, propylene, isopropylidene, cyclohexylene, cyclopentylidene, and others; an oxygen ether, carbonyl, amine, or a sulfur containing linkage, such as, sulfide, sulfoxide, sulfone, and others; or two or more alkylene or alkylidene linkages connected by such groups as aromatic, amino, ether, carbonyl, sulfide, sulfoxide, sulfone, and other groups; Ar and Ar' are each independently a mono- or polycarbocyclic aromatic group such as phenylene, biphenylene, terphenylene, naphthylene, and others, wherein hydroxyl and Y substituents on Ar and Ar' can be varied in the ortho, meta or para positions on the aromatic rings and the groups can be in any possible geometric relationship with respect to one another; each Y is independently an organic, inorganic or organometallic radical, for example (1) a halogen such as chlorine, bromine, iodine, or fluorine, (2) an ether group of the general formula —OE, wherein E is a monovalent hydrocarbon radical similar to X, (3) monovalent hydrocarbon groups of the type represented by R or (4) other substituents, e.g., nitro, cyano, and the like, said substituents being essentially inert provided there be at least one and preferably two halogen atoms per aryl nucleus; each X is independently a monovalent $C_{1-18}$ hydrocarbon group such as methyl, propyl, isopropyl, decyl, phenyl, naphthyl, biphenyl, xylyl, tolyl, benzyl, ethylphenyl, cyclopentyl, cyclohexyl, and the like, each optionally containing inert substituents; each d is independently 1 to a maximum equivalent to the number of replaceable hydrogens substituted on the aromatic rings comprising Ar or Ar'; each e is independently 0 to a maximum equivalent to the number of replaceable hydrogens on R; and each a, b, and c is independently a whole number, including 0, with the proviso that when b is 0, either a or c, but not both, may be 0, and when b is not 0, neither a nor c may be 0.

Included within the scope of the above formula are bisphenols of which the following are representative: bis(2,6-dibromophenyl)methane; 1,1-bis-(4-iodophenyl)ethane; 2,6-bis(4,6-dichloronaphthyl)propane; 2,2-bis(2,6-dichlorophenyl)pentane; bis(4-hydroxy-2,6-dichloro-3-methoxyphenyl)methane; and 2,2-bis(3-bromo-4-hydroxyphenyl)propane. Also included within the above structural formula are 1,3-dichlorobenzene, 1,4-drombenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like. Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants are generally used in amounts of about 1 to about 50 parts by weight, based on 100 parts by weight of the thermoplastic composition.

Inorganic flame retardants may also be used, for example salts of $C_{1-16}$ alkyl sulfonates such as potassium perfluorobutane sulfonate (Rimar salt), potassium perfluorooctane sulfonate, tetraethylammonium perfluorohexane sulfonate, and potassium diphenylsulfone sulfonate; salts such as $CaCO_3$, $BaCO_3$, and $BaCO_3$; salts of fluoro-anion complex such as $Li_3AlF_6$, $BaSiF_6$, $KBF_4$, $K_3AlF_6$, $KAlF_4$, $K_2SiF_6$, and $Na_3AlF_6$; and the like. When present, inorganic flame retardant salts are generally present in amounts of about 0.01 to about 25 parts by weight, more specifically about 0.1 to about 10 parts by weight, based on 100 parts by weight of the thermoplastic composition.

Anti-drip agents may also be used, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents are generally used in amounts of about 0.1 to about 10 parts by weight, based on 100 parts by weight of the thermoplastic composition.

The thermoplastic compositions may be manufactured by methods generally available in the art, for example, in one embodiment, in one manner of proceeding, powdered polycarbonate, impact modifier composition, aromatic vinyl copolymer, additives and/or other optional components are first blended, optionally with any fillers in a Henschel™ type high speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Other processing methods, such as a single screw extruder, Buss™ kneader, Banbury™ mixer, and the like, may be used for processing, as known to a skilled artisan. Such additives may also be compounded into a masterbatch with a desired polymeric resin and fed into the extruder. The additives may be added to either the polycarbonate base materials or the impact modifier base material to make a concentrate, before this is added to the final product. The extruder is generally operated at a temperature higher than that necessary to cause the composition to flow, typically 500° F. (260° C.) to 650° F. (343° C.). The extrudate is immediately quenched in a water batch and pelletized. The pellets, so prepared, when cutting the extrudate may be one-fourth inch long or less as desired. Such pellets may be used for subsequent molding, shaping, or forming.

Shaped, formed, or molded articles comprising the thermoplastic compositions are also provided. The thermoplastic compositions may be molded into useful shaped articles by a variety of means such as injection molding, extrusion, rotational molding, blow molding and thermoforming to form articles such as, for example, instrument panels for automobiles, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, automobiles, trucks, recreational vehicles, trains, buses, lawn and garden equipment, furniture, and others.

The compositions find particular utility in automotive applications, for example interior parts such as instrument panels, overhead consoles, interior trim, center consoles, and other interior parts; and exterior parts such as body panels, exterior trim, bumpers, and others.

The compositions described herein may further have excellent physical properties and good processability. For example, the thermoplastic polycarbonate compositions may have a heat deflection temperature (HDT) of about 65° C., more specifically about 95° C., even more specifically about 115° C., measured at 1.8 MPa, on a 4 mm thick bar according to ISO 75Ae.

The thermoplastic polycarbonate compositions may further have a low temperature notched Izod Impact of greater than about 25 $KJ/m^2$, specifically greater than about 40 $KJ/m^2$, determined at −30° C. using a 4 mm thick bar per ISO 180/1A.

The thermoplastic polycarbonate compositions may further have a Vicat B/120 of greater than about 90° C., more specifically greater than about 105° C., more specifically greater than about 120° C., determined using a 4 mm thick bar per ISO 306.

The invention is further illustrated by the following non-limiting Examples, which were prepared from the components set forth in Table 1.

The SAN used is a bulk process material having a nominal acrylonitrile content of 25 wt. %, although SAN or other rigid polymers (vinyl aromatic polymers) having different

TABLE 1

| Component | Type | Source |
|---|---|---|
| PC-1 | High flow BPA polycarbonate resin with a weight average molecular weight of about 22,000 on an absolute PC molecular weight scale | SABIC Innovative Plastics (formerly GE Plastics) |
| PC-2 | Low flow BPA polycarbonate resin with a weight average molecular weight of about 30,000 on an absolute PC molecular weight scale | SABIC Innovative Plastics (formerly GE Plastics) |
| MBS | Nominal 75-82 wt. % butadiene core with a balance of styrene-methyl methacrylate shell. (Trade name EXL 2691A) | Rohm & Haas |
| BABS | Bulk Acrylonitrile Butadiene Styrene with a nominal 16% butadiene content and 15% Acrylonitrile. The butadiene is present in the form of a rubber that is 85-100 wt % butadiene and 15-0 wt % styrene. The SAN phase is inverted such that occluded SAN is contained within a rubber phase in a SAN matrix. | SABIC Innovative Plastics (formerly GE Plastics) |
| HRG | High rubber graft emulsion polymerized ABS comprising 15-35 wt. % acrylonitrile and 85-65 wt. % styrene grafted on to particles of comprising about 85-100 wt. % butadiene and 15-0 wt. % styrene. The particles represent about 25-75% of the total emulsion ABS. The materials are crosslinked to a density of 43-55% as measured by sol-gel fraction. | SABIC Innovative Plastics (formerly GE Plastics) |
| SAN-1 | Styrene acrylonitrile copolymer comprising about 23 to 25 wt. % acrylonitrile, bulk processed, weight average molecular weight of about 72,000 (Calibrated on Polystyrene standards based GPC weight average molecular weight) | SABIC Innovative Plastics (formerly GE Plastics) |
| SAN-2 | Styrene acrylonitrile copolymer comprising about 23 to 25 wt. % acrylonitrile, bulk processed, weight average molecular weight of about 97,000 (Calibrated on Polystyrene standards based GPC weight average molecular weight) | SABIC Innovative Plastics (formerly GE Plastics) |
| PC-Si | Polydimethylsiloxane - bisphenol A polycarbonate copolymer, 20 wt % polydimethylsiloxane content, Mw about 30,000 on an absolute PC molecular weight scale | SABIC Innovative Plastics (formerly GE Plastics) |
| MR-1 | Pentaerythritol Tetrastearate (Tradename Luxiol ™ P 861) | Cognis Oleo Chemicals |
| MR-2 | Synthetic Hydrocarbon PAO (Tradename Durasyn ™ 164) | Innovene USA, LLC |
| MR-3 | Polyethylene Oxide/Polypropylene Oxide Block Copolymer Mold Release (Tradename Pluronic ™ F88) | BASF Corporation |
| BPADP | Bisphenol A bis(diphenylphosphate) | Supresta |
| RDP | Resorcinol bis(diphenyl phosphate) | Supresta |
| TSAN | PTFE (polytetrafluoroethylene) encapsulated in SAN (50% fluoropolymer) | SABIC Innovative Plastics (formerly GE Plastics) |

In the examples below, the polycarbonates (PC) are based on Bisphenol A, and have a weight average molecular weight of 10,000 to 120,000, more specifically 18,000 to 40,000 (on an absolute molecular weight scale), available from SABIC Innovative Plastics (formerly GE Plastics) under the trade name LEXAN®. The initial melt flow of the polycarbonates can range from about 2 to about 66 measured at 300° C. using a 1.2 Kg load, per ASTM D1238.

The MBS used in the examples is Rohm & Haas MBS EXL2691A (powder) having 75 to 82 wt. % butadiene core with a balance styrene-methyl methacrylate shell, but others, such as Rohm & Haas EXL3691A (pelletized) could also be used. The MBS is preferably manufactured in accordance with the process described U.S. Pat. No. 6,545,089, and is substantially free of impurities, residual acids, residual bases or residual metals that may catalyze the hydrolysis of polycarbonate. Control of the manufacture of the MBS to provide a slurry of the MBS having a pH of about 6 to about 7 provides optimal hydrolytic stability. The pH of a slurry of each of the components is measured using 1 g of the component and 10 mL of distilled water having a pH of 7 and containing a drop of isopropyl alcohol as a wetting agent.

amounts of acrylonitrile and made by either the bulk or suspension process could also be used.

The Bulk Acrylonitrile Butadiene Styrene (ABS, also referred to as bulk ABS or BABS) has a nominal 16% butadiene content and 15% Acrylonitrile, where the butadiene is present in the form of a rubber that is 85 to 100 wt % butadiene and 15 to 0 wt % styrene, and the SAN phase is inverted such that occluded SAN is contained within a rubber phase in a SAN matrix. The BABS is from SABIC Innovative Plastics (formerly GE Plastics), although ABS or other bulk ABS having different amounts of acrylonitrile and butadiene could also be used. In an exemplary embodiment, the ABS is manufactured in accordance with the process described U.S. Pat. No. 6,545,089, and is substantially free of impurities, residual acids, residual bases or residual metals that may catalyze the hydrolysis of polycarbonate. Control of the manufacture of the ABS to provide a slurry of the ABS having a pH of about 6 to about 7 provides optimal hydrolytic stability. The pH of a slurry of each of the components is measured using 1 g of the component and 10 mL of distilled water having a pH of 7 and containing a drop of isopropyl alcohol as a wetting agent.

The polycarbonate-polysiloxane used is a copolymer of bisphenol A polycarbonate and polydimethylsiloxane having about 20% siloxane content, although other polycarbonate-polysiloxane copolymers having different siloxane content may also be used.

The samples in Tables 2 and 3 were prepared by melt extrusion on a Werner & Pfleiderer™ 70 mm twin screw extruder, using a nominal melt temperature of 250° C., 60 cm of mercury vacuum, 80 to 90% torque, and 600 rpm. The extrudate was pelletized and dried at about 100° C. for about 2 hours. To make test specimens, the dried pellets were injection molded on a 110-ton injection molding machine at a nominal temperature of 260° C. The samples in Tables 6 to 11 were prepared by melt extrusion on a 9 barrel Werner & Pfleiderer 30 mm extruder, using a nominal melt temperature of 525° F., 90 to 95% torque, and 500 rpm. The extrudate was stranded and cooled in a water bath, and chopped into pellets approximately ⅛ inch long by ⅛ inch diameter. To make test specimens for samples in Tables 10 and 11, the dried pellets were injection molded on a 85-ton injection molding machine at a nominal melt temperature of 470° F., mold set temperature of 150° F., 100 rpm, 2 in/s injection speed, maximum injection pressure of 1100 psi, hold pressure of 1100 psi, 35 second cycle time. To make test specimens for samples in Tables 6 to 9, the dried pellets were injection molded on a 85-ton injection molding machine at a nominal melt temperature of 525° F., mold set temperature of 170° F., 100 rpm, 2 in/s injection speed, maximum injection pressure of 1000 psi, hold pressure of 1000 psi, 35 second cycle time. The samples in Tables 4 and 5 were prepared by melt extrusion on a 8 barrel Werner & Pfleiderer™ 30 mm extruder, using a nominal melt temperature of 572° F., 90 to 95% torque, and 400 rpm. The extrudate was stranded and cooled in a water bath, and chopped into pellets approximately ⅛ inch long by ⅛ inch diameter. To make test specimens, the dried pellets were injection molded on a 85-ton injection molding machine at a nominal melt temperature of 555° F., mold set temperature of 180° F., 60 rpm, 2 in/s injection speed, maximum injection pressure of 1500 psi, hold pressure of 600 to 800 psi, 35 second cycle time. Specimens were tested in accordance with ASTM and/or ISO standards as described below.

Tensile properties such as Chord (or Tensile) Modulus, Stress at Yield, Stress at Break, Strain at Yield and Strain at Break were determined using 4 mm thick molded tensile bars tested per ISO 527 at 50 mm/min. It is also possible to measure at 5 mm/min. if desired for the specific application, but the samples measured in these experiments were measured at 50 mm/min. Tensile modulus is always measured at the start of the test with an initial rate of 1 mm/min, after which the test is continued at 50 mm/min. to measure the other tensile properties.

Flexural Modulus and Flexural Strength were determined using a 4 mm-thick bar cut from the tensile bar, pursuant to ISO 178.

Izod Impact Strength was measured according to ISO 180 (referred to as 'NII' or 'INI') or ASTM D256 as indicated in the Tables. ISO 180 ('NII' or 'INI') is used to compare the impact resistances of plastic materials. ISO Izod Impact was determined using a 4 mm thick test sample cut from the tensile bars described above. It was determined per ISO 180/1A. The ISO designation reflects type of specimen and type of notch: ISO 180/1A means specimen type 1 and notch type A. The ISO results are defined as the impact energy in joules used to break the test specimen, divided by the specimen area at the notch. Results are reported in kJ/m². ASTM D256 is used to measure ASTM Izod Impact, which was determined using a molded Izod impact bar 3.2 mm thick, 12.5 mm wide, and 3 inches long. The samples were impacted with an impact energy of 5.5 J. Izod impact D/B refers to the ductile—brittle transition temperature, which is the temperature at which % ductility equals 50%.

Vicat Softening Temperature (ISO 306) is a measure of the temperature at which a plastic starts to soften rapidly. A round, flat-ended needle of 1 mm² cross section penetrates the surface of a plastic test specimen under a predefined load, and the temperature is raised at a uniform rate. The Vicat softening temperature, or VST, is the temperature at which the penetration reaches 1 mm. ISO 306 describes two methods: Method A—load of 10 Newtons (N), and Method B—load of 50 N, with two possible rates of temperature rise: 50° C./hour (° C./h) or 120° C./h. This results in ISO values quoted as A/50, A/120, B/50 or B/120. The test assembly is immersed in a heating bath with a starting temperature of 23° C. After 5 minutes (min) the load is applied: 10 N or 50 N. The temperature of the bath at which the indenting tip has penetrated by 1±0.01 mm is reported as the VST of the material at the chosen load and temperature rise. These samples in these experiments were measured under condition B/120.

Heat Deflection Temperature (HDT) is a relative measure of a material's ability to perform for a short time at elevated temperatures while supporting a load. The test measures the effect of temperature on stiffness: a standard test specimen is given a defined surface stress and the temperature is raised at a uniform rate. Heat Deflection Test (HDT) was determined per ISO 75Af, using a flat, 4 mm thick bar cut from the Tensile bar and subjected to 1.8 MPa.

Melt Volume Rate (MVR) was determined at 260° C. using a 5-kilogram weight, with a six minute preheat, according to ASTM D1238. In some experiments, Melt Volume Rate was also determined with an eighteen minute preheat according to ASTM D1238. In other experiments, Melt Volume Rate was also measured at 265° C. with a four minute preheat according to ISO 1133. Melt Stability is a measure of the percent shift in Melt Volume Rate when going from a 6 minute preheat to an 18 minute preheat.

High Shear Melt Viscosity is measured on a capillary rheometer at 260° C. at a shear rate of 5,000 s$^{-1}$ according to ISO 11443.

Instrumental Impact (or Multi-Axial Impact (MAI) or Dynatup Plaque Impact Energy) was measured according to D3763 using a plaque 3.2 mm thick, 10 centimeters diameter, with a dart diameter of 12.5 mm at 6.6 m/s. The results represent the total energy absorbed and are reported in Joules. This procedure provides information on how a material behaves under multiaxial deformation conditions. The deformation applied is a high speed puncture. The final test result is calculated as the average of the test results of either five or ten test plaques.

Percent ductility was determined on 3.2 mm (one-eighth inch) plaques (as molded for Instrumental Impact test according to D3763) at room temperature using the impact energy as well failure mode of the part. Brittle failure is characterized by limited plastic deformation and breakage of the part into multiple pieces. Ductile failure is characterized by significant plastic deformation and yielding of the part. Ductile parts do not break into multiple pieces. Percent ductility is expressed as a percentage of impact bars that exhibited ductile failure mode. Ductility tends to decrease with temperature, and the ductile transition temperature is the temperature at which % ductility equals 50%.

Examples 1 to 8 were produced at various levels of components from Table 1. The formulations used are shown in Table 2 below. All amounts are in weight percent (wt. %).

TABLE 2

| COMPONENTS | Units | 1 | 2 | 3 | 4 | 5 | 6 | 7 | 8 |
|---|---|---|---|---|---|---|---|---|---|
| PC-1 | % | 36.32 | 36.25 | 36.27 | 18.14 | 14.14 | 14.01 | 14.01 | 13.90 |
| PC-2 | % | 36.32 | 36.24 | 36.27 | 54.40 | 54.40 | 54.03 | 54.03 | 53.64 |
| PC-Si | % | 0 | 0 | 0 | 0 | 4.00 | 4.00 | 4.00 | 4.00 |
| BABS | % | 17.66 | 17.66 | 17.66 | 17.66 | 17.66 | 17.66 | 17.66 | 17.66 |
| MBS | % | 3.01 | 3.01 | 3.01 | 3.01 | 3.01 | 3.01 | 3.01 | 3.01 |
| SAN-1 | % | 5.49 | 5.49 | 5.49 | 5.49 | 5.49 | 5.49 | 5.49 | 5.49 |
| MR-1 | % | 0.40 | 0.40 | 0 | 0 | 0 | 0.50 | 0 | 0.50 |
| MR-2 | % | 0 | 0.15 | 0.50 | 0.50 | 0.50 | 0.50 | 0.50 | 0.50 |
| MR-3 | % | 0 | 0 | 0 | 0 | 0 | 0 | 0.50 | 0.50 |
| Stabilization Package* | % | 0.80 | 0.80 | 0.80 | 0.80 | 0.80 | 0.80 | 0.80 | 0.80 |

*A stabilization package comprising hindered phenol antioxidant, phosphite secondary stabilizer and/or thioester secondary stabilizer was also added to the samples. Stabilization packages are well known to one skilled in the art, and amounts and types may vary as desired.

The samples from Table 2 were then tested according to the test methods described above. Results of the tests are shown in Table 3.

The data in Table 3 shows that the Examples comprising a blend of a polycarbonate, a polycarbonate-polysiloxane copolymer, an impact modifier composition comprising

TABLE 3

| PHYSICAL PROPERTIES | | 1 | 2 | 3 | 4 | 5 | 6 | 7 | 8 |
|---|---|---|---|---|---|---|---|---|---|
| Flex Modulus | MPa | 2146 | 2306 | 2285 | 2269 | 2240 | 2217 | 2207 | 2252 |
| Flex Strength | MPa | 82 | 84 | 85 | 83 | 81 | 81 | 80 | 81 |
| HDT (1.82 MPa) | °C. | 108 | 108 | 109 | 109 | 107 | 108 | 107 | 105 |
| INI, 23° C. | kJ/m$^2$ | 57 | 58 | 62 | 62 | 64 | 68 | 68 | 70 |
| INI, −30° C. | kJ/m$^2$ | 30 | 30 | 38 | 34 | 48 | 53 | 51 | 47 |
| MAI Ductility, 23° C. | % | 100 | 100 | 100 | 100 | 100 | 100 | 100 | 100 |
| MAI Puncture Energy, 23° C. | J | 90 | 100 | 101 | 104 | 109 | 97 | 106 | 105 |
| MAI Ductility, −30° C. | % | 100 | 100 | 100 | 100 | 100 | 100 | 100 | 100 |
| MAI Puncture Energy, −30° C. | J | 87 | 101 | 106 | 110 | 112 | 109 | 111 | 107 |
| MAI Ductility, −40° C. | % | 77 | 90 | 63 | 33 | 100 | 93 | 100 | 100 |
| MAI Puncture Energy, −40° C. | J | 81 | 103 | 105 | 108 | 112 | 106 | 112 | 109 |
| Tensile Modulus | MPa | 2206 | 2197 | 2208 | 2159 | 2134 | 2232 | 2214 | 2203 |
| Tensile Stress at Yield | MPa | 57 | 56 | 57 | 54 | 53 | 53 | 52 | 53 |
| Tensile Stress at Break | MPa | 58 | 56 | 57 | 58 | 58 | 60 | 57 | 58 |
| Tensile Strain at Yield | MPa | 5 | 5 | 5 | 5 | 5 | 5 | 4 | 4 |
| Tensile Strain at Break | MPa | 124 | 105 | 104 | 106 | 111 | 118 | 109 | 113 |
| Vicat B/120 | °C. | 132 | 131 | 131 | 131 | 129 | 128 | 127 | 125 |
| MVR 260° C. 5 kg | cm$^3$/10 min | 23 | 25 | 18 | 17 | 15 | 14 | 18 | 19 |
| MV 260° C. at 5000 s$^{-1}$ | Pa-s | 96 | 87 | 92 | 95 | 99 | 99 | 87 | 88 |
| Cracking[1] | — | 5-7 | 5-7 | 5-7 | 2 | 20 | 25 | 18 | No cracking |

[1] Cracking represents the number of mold shots that were without cracking, after which cracking in the part occurred when the part was ejected from the mold. For example, for sample 1, the average number of parts that were molded before cracking was observed was 5 to 7, while for sample 4, cracking was observed after only 2 shots, and for sample 8, there was no cracking observed.

BABS and a second impact modifier (MBS), SAN and optionally, a combination of mold release additives, have an excellent balance of properties (flow/impact balance), good mold ejection (lack of cracking), without significant sacrifice in other physical properties. As shown by Examples 5 to 8, the samples with the composition of the invention have the best low temperature ductility (at −40° C.) and the best molding performance, where either no cracking occurred, or cracking occurred after a larger number of parts were molded, as compared to the samples without all of the components of the invention. The best composition for a balance of properties and the best cracking performance was Example 8, which had the combination of three different mold release additives, as compared to a the compositions with a single mold release additive or a combination of only two mold release additives.

Additional samples were tested for their mold release capability. The materials listed in Table 1 were used to make the samples, and the amounts used are listed in Tables 4, 6, 8 and 10. The samples were tested for ejection pressure, or the force needed to eject the part from the mold, and the results are shown in Tables 5, 7, 9 and 11. The test used is as follows:

A cup shaped square mold tool approximately 70 mm on each side and 40 mm high with 4 mm thick walls having a center gate was used. In the mold, there were four cylindrical posts near each corner, each post was about ½ inch high and ⅜ inch in diameter. At the end of each post is a knock out pin, which is used to eject the part from the mold. The knock out pins each had a transducer to measure the force required to eject the part. The purpose of the posts is to create areas of thermal mass and increased surface area within the mold, to increase the amount of part drag during ejection from the mold. Parts were injection molded at the melt and mold temperatures listed in the Tables, and the cycle time and pressure measured are listed in Tables 5, 7, 9 and 11. This tool, used to evaluate mold sticking, is an example of the type of tool in which mold sticking occurs. Many tools that featured areas of high thermal mass and substantial surface areas parallel to the ejection direction of the tool, such that high drag forces are exerted on the part during ejection from the mold, would be equally useful in evaluating mold sticking/mold release characteristics. The use of pressure transducers in the knock-out pins allows for quantification of the mold release forces.

The mold temperatures, melt temperatures and cycle times are different for different compositions. In general, longer cycle times are required for the FR compositions because they have lower HDT (and lower Tg) values and must cool more to reach the same supercooling from the glass transition temperature as the other samples. The higher the Tg, the faster the thermoplastic material cools in the mold and set up to become rigid enough to be ejected from the tool without part distortion.

TABLE 4

| COMPONENTS | Units | 1 | 2 | 3 | 4 |
|---|---|---|---|---|---|
| PC-1 | % | 100.00 | 100.00 | 100.00 | 100.00 |
| MR-1 | % | 1.50 | 0 | 0 | 0.50 |
| MR-2 | % | 0 | 1.50 | 0 | 0.50 |
| MR-3 | % | 0 | 0 | 1.50 | 0.50 |
| Stabilization Package* | % | 0.60 | 0.60 | 0.60 | 0.60 |

*A stabilization package comprising hindered phenol antioxidant, phosphite secondary stabilizer and/or thioester secondary stabilizer was also added to the samples. Stabilization packages are well known to one skilled in the art, and amounts and types may vary as desired.

TABLE 5

| CYCLE TIME | Units | EJECTION PRESSURE | | | |
|---|---|---|---|---|---|
| | | PC1 | PC2 | PC3 | PC4 |
| 35 seconds | Psi | 2784 | 2708 | 2582 | 2026 |
| 40 seconds | Psi | 4495 | 4302 | 2903 | 2328 |
| 45 seconds | psi | 4950 | 5041 | 2776 | 2611 |

The results of Table 5 show that the composition comprising polycarbonate and a combination of mold release additives compared to the compositions comprising polycarbonate and only one of the mold release additive had lower ejection pressures at all cycle times than the compositions with the same amount of only one mold release additive (compare sample PC4, which has a combination of three different mold release additives, to samples PC1, PC2 and PC3, which each had only one mold release additive).

TABLE 6

| COMPONENTS | Units | NFR1 | NFR2 | NFR3 | NFR4 | NFR5 | NFR6 | NFR7 | NFR8 |
|---|---|---|---|---|---|---|---|---|---|
| PC-1 | % | 35.0 | 35.0 | 35.0 | 35.0 | 0 | 0 | 0 | 0 |
| PC-2 | % | 35.0 | 35.0 | 35.0 | 35.0 | 65.0 | 65.0 | 65.0 | 65.0 |
| PC-Si | % | 2.0 | 2.0 | 2.0 | 2.0 | 0 | 0 | 0 | 0 |
| BABS | % | 18.0 | 18.0 | 18.0 | 18.0 | 0 | 0 | 0 | 0 |
| HRG | % | 0 | 0 | 0 | 0 | 19.0 | 19.0 | 19.0 | 19.0 |
| MBS | % | 4.0 | 4.0 | 4.0 | 4.0 | 0 | 0 | 0 | 0 |
| SAN-1 | % | 6.0 | 6.0 | 6.0 | 6.0 | 0 | 0 | 0 | 0 |
| MR-1 | % | 1.50 | 0 | 0 | 0.50 | 1.50 | 0 | 0 | 0.50 |
| MR-2 | % | 0 | 1.50 | 0 | 0.50 | 0 | 1.50 | 0 | 0.50 |
| MR-3 | % | 0 | 0 | 1.50 | 0.50 | 0 | 0 | 1.50 | 0.50 |
| Others* | % | 0.60 | 0.60 | 0.60 | 0.60 | 0.60 | 0.60 | 0.60 | 0.60 |

*A stabilization package comprising hindered phenol antioxidant, phosphite secondary stabilizer and/or thioester secondary stabilizer was also added to the samples. Stabilization packages are well known to one skilled in the art, and amounts and types may vary as desired.

TABLE 7

| CYCLE TIME | Units | NFR1 | NFR2 | NFR3 | NFR4 | NFR5 | NFR6 | NFR7 | NFR8 |
|---|---|---|---|---|---|---|---|---|---|
| | | | | | EJECTION PRESSURE | | | | |
| 45 seconds | Psi | 4078 | 4042 | 4260 | 3646 | 3664 | 3320 | 2977 | 3074 |
| 50 seconds | Psi | 4205 | 3158 | 5382 | 3078 | 3940 | 3516 | 3148 | 2936 |
| 55 seconds | psi | 1942 | 1690 | 6008 | 1215 | 4302 | 2316 | 1944 | 2468 |

The results in Table 7 show that the samples having a composition comprising polycarbonate, polycarbonate-polysiloxane copolymer, two impact modifiers (BABS and MBS) and a rigid copolymer (SAN) had lower ejection pressures when a combination with the three mold release additives was used (compare sample NFR4 to samples NFR1, NFR2 and NFR3). For samples with only polycarbonate and one impact modifier (HRG), the sample with the combination of three mold release additives (NFR8) performed similarly to the sample with the single polyethylene oxide/polypropylene oxide block copolymer mold release additive (NFR7). Both samples, NFR7 and NFR8, generally performed better than the samples with either of the other two mold release additives. The data in Table 7 also shows that the combination of three mold release additives, when used in the same total amount as a single mold release additive, does not always provide the lowest ejection pressures at all cycle times (see, for example NFR8 compared to NFR6 at 55 seconds or NFR7 at 45 or 55 seconds, where NFR8 is slightly higher). Samples having the composition comprising polycarbonate, polycarbonate-polysiloxane, two impact modifiers (BABS and MBS), the a rigid copolymer (SAN) and the three mold release additives consistently had better (lower) ejection pressures than those with only one or two mold release additives, while those samples without this combination of materials, even with three mold release additives, did not necessarily perform better.

TABLE 8

| COMP. | Units | NFR9 | NFR10 | NFR11 | NFR12 | NFR13 | NFR14 | NFR15 | NFR16 | NFR17 | NFR18 | NFR19 |
|---|---|---|---|---|---|---|---|---|---|---|---|---|
| PC-1 | % | 36.0 | 36.0 | 36.0 | 36.0 | 36.0 | 36.0 | 36.0 | 36.0 | 36.0 | 36.0 | 36.0 |
| PC-2 | % | 36.0 | 36.0 | 36.0 | 36.0 | 36.0 | 36.0 | 36.0 | 36.0 | 36.0 | 36.0 | 36.0 |
| BABS | % | 18.0 | 18.0 | 18.0 | 18.0 | 18.0 | 18.0 | 18.0 | 18.0 | 18.0 | 18.0 | 18.0 |
| MBS | % | 4.0 | 4.0 | 4.0 | 4.0 | 4.0 | 4.0 | 4.0 | 4.0 | 4.0 | 4.0 | 4.0 |
| SAN-1 | % | 6.0 | 6.0 | 6.0 | 6.0 | 6.0 | 6.0 | 6.0 | 6.0 | 6.0 | 6.0 | 6.0 |
| MR-1 | % | 0.50 | 1.50 | 0 | 0 | 0 | 0 | 0.50 | 0.75 | 0 | 0.75 | 0.25 |
| MR-2 | % | 0 | 0 | 0.50 | 1.50 | 0 | 0 | 0.50 | 0.75 | 0.75 | 0 | 0.25 |
| MR-3 | % | 0 | 0 | 0 | 0 | 0.50 | 1.50 | 0.50 | 0 | 0.75 | 0.75 | 0.25 |
| Stab. Package* | % | 0.60 | 0.60 | 0.60 | 0.60 | 0.60 | 0.60 | 0.60 | 0.60 | 0.60 | 0.60 | 0.60 |

*A stabilization package comprising hindered phenol antioxidant, phosphite secondary stabilizer and/or thioester secondary stabilizer was also added to the samples. Stabilization packages are well known to one skilled in the art, and amounts and types may vary as desired.

TABLE 9

| CYCLE TIME | Units | NFR9 | NFR10 | NFR11 | NFR12 | NFR13 | NFR14 | NFR15 | NFR16 | NFR17 | NFR18 | NFR19 |
|---|---|---|---|---|---|---|---|---|---|---|---|---|
| | | | | | | EJECTION PRESSURE | | | | | | |
| 45 seconds | Psi | 7533 | 3220 | 1970 | 1766 | 10324 | 8550 | 2270 | 2331 | 1302 | 4602 | 4968 |
| 50 seconds | Psi | 6120 | 2616 | 2072 | 2132 | 12117 | 10142 | 1926 | 1525 | 1314 | 2354 | 3030 |
| 55 seconds | psi | 4916 | 1500 | 1190 | 1172 | 12654 | 10897 | 1640 | 1894 | 1716 | 2524 | NA[2] |

[2]Data not available for this sample.

The results in Table 9 show that the samples having a composition comprising polycarbonate, polycarbonate-polysiloxane copolymer, two impact modifiers (BABS and MBS) and a rigid copolymer (SAN) had lower ejection pressures at shorter cycle times when a combination with the three mold release additives was used at a level of 1.5 wt % than samples having only one mold release additive at the same level (compare sample NFR15 to samples NFR10, NFR12 and NFR14), or when compared to samples having all three mold release additives but at a lower total level (see NFR19, which had all three mold release additives but at a level of 0.75 wt % total). Additionally, the samples having higher amounts only two of the mold release additives for the same overall level also had good molding capability as shown by the ejection pressures (see samples NFR16, NFR17 and NFR18).

As used herein, "(meth)acrylate" is inclusive of both acrylates and methacrylates. Further, as used herein, the terms "first," "second," and the like do not denote any order or importance, but rather are used to distinguish one element from another, and the terms "the", "a" and "an" do not denote a limitation of quantity, but rather denote the presence of at least one of the referenced item. All ranges disclosed herein for the same properties or amounts are inclusive of the endpoints, and each of the endpoints is independently combinable. All cited patents, patent applications, and other references are incorporated herein by reference in their entirety.

The modifier "about" used in connection with a quantity is inclusive of the stated value and has the meaning dictated by the context (that is, includes the degree of error associated with measurement of the particular quantity).

TABLE 10

| COMPONENTS | Units | FR1 | FR2 | FR3 | FR4 | FR5 | FR6 | FR7 | FR8 |
|---|---|---|---|---|---|---|---|---|---|
| PC-1 | % | 47.5 | 47.5 | 47.5 | 47.5 | 24.33 | 24.33 | 24.33 | 24.33 |
| PC-2 | % | 20.4 | 20.4 | 20.4 | 20.4 | 56.78 | 56.78 | 56.78 | 56.78 |
| PC-Si | % | 7.5 | 7.5 | 7.5 | 7.5 | 0 | 0 | 0 | 0 |
| BABS | % | 11.55 | 11.55 | 11.55 | 11.55 | 0 | 0 | 0 | 0 |
| HRG | % | 0 | 0 | 0 | 0 | 6.05 | 6.05 | 6.05 | 6.05 |
| SAN-2 | % | 0 | 0 | 0 | 0 | 4.28 | 4.28 | 4.28 | 4.28 |
| MR-1 | % | 1.50 | 0 | 0 | 0.50 | 1.50 | 0 | 0 | 0.50 |
| MR-2 | % | 0 | 1.50 | 0 | 0.50 | 0 | 1.50 | 0 | 0.50 |
| MR-3 | % | 0 | 0 | 1.50 | 0.50 | 0 | 0 | 1.50 | 0.50 |
| BPADP | % | 12.3 | 12.3 | 12.3 | 12.3 | 0 | 0 | 0 | 0 |
| RDP | % | 0 | 0 | 0 | 0 | 8.06 | 8.06 | 8.06 | 8.06 |
| TSAN | % | 0.75 | 0.75 | 0.75 | 0.75 | 0.5 | 0.5 | 0.5 | 0.5 |
| Stabilization Package* | % | 0.60 | 0.60 | 0.60 | 0.60 | 0.60 | 0.60 | 0.60 | 0.60 |

*A stabilization package comprising hindered phenol antioxidant, phosphite secondary stabilizer and/or thioester secondary stabilizer was also added to the samples. Stabilization packages are well known to one skilled in the art, and amounts and types may vary as desired.

TABLE 11

| CYCLE TIME | Units | EJECTION PRESSURE | | | | | | | |
|---|---|---|---|---|---|---|---|---|---|
| | | FR1 | FR2 | FR3 | FR4 | FR5 | FR6 | FR7 | FR8 |
| 60 seconds | Psi | 2069 | 2578 | 3412 | 1243 | 4894 | 6476 | 1504 | 1060 |
| 65 seconds | Psi | 1822 | 2456 | 4007 | 3689 | 4777 | 5634 | 4218 | 3900 |
| 70 seconds | psi | 1507 | 4538 | 3940 | 3653 | 4408 | 5123 | 3994 | 3394 |

The results in Table 11 show that the samples having a composition comprising polycarbonate, polycarbonate-polysiloxane copolymer, impact modifier (BABS) and a flame retardant additive had lower ejection pressures at the shortest cycle time when a combination with the three mold release additives was used (compare sample FR4 to samples FR1, FR2 and FR3). For samples with only polycarbonate, one impact modifier (HRG), a rigid copolymer and a flame retardant additive, the sample with the combination of three mold release additives had lower ejection pressures at the shortest cycle time (compare sample FR8 to samples FR5, FR6 and FR7). Additionally, the sample with the single polyethylene oxide/polypropylene oxide block copolymer mold release additive (FR7) in combination with the polycarbonate, HRG, SAN and flame retardant performed better than the samples with the other single mold release additives (FR5 and FR6).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A thermoplastic composition comprising:
   from 65 to 80 wt. % of a polycarbonate,
   from 2 to 10 wt. % of a polycarbonate-polysiloxane copolymer,
   from 15 to 25 wt. % an impact modifier composition comprising ABS or BABS and a second impact modifier different from BABS or ABS,
   from 1 to 10 wt. % of an aromatic vinyl copolymer, and
   from 1.5 to 3 wt % total of a combination of at least three different mold release additives, wherein a molded sample of the thermoplastic composition has better cracking performance compared to a sample of the same thermoplastic composition without the combination of three mold release additives.

2. The thermoplastic composition of claim 1, wherein the second impact modifier is MBS.

3. The thermoplastic composition of claim 1, wherein the aromatic vinyl copolymer is SAN.

4. The thermoplastic composition of claim 1, wherein the mold release additives are each present in equal amounts.

5. The thermoplastic composition of claim 4, wherein a molded sample of the thermoplastic composition has lower ejection pressure from the mold compared to a sample of the same thermoplastic composition without the three mold release additives.

6. The thermoplastic composition of claim 1, further comprising a flame retardant additive.

7. An article comprising the composition of claim 1.

8. A thermoplastic composition comprising:
from 65 to 80 wt. % of a polycarbonate,
from 2 to 10 wt. % of a polycarbonate-polysiloxane copolymer,
from 15 to 25 wt. % an impact modifier composition comprising ABS or BABS and a second impact modifier different from BABS or ABS,
from 1 to 10 wt. % of an aromatic vinyl copolymer, and
from 1.5 to 3 wt % total of a combination of at least three different mold release additives,
wherein a molded sample of the thermoplastic composition has lower ejection pressure from the mold compared to a sample of the same thermoplastic composition without the three mold release additives.

9. The thermoplastic composition of claim 8, wherein the second impact modifier is MBS and the aromatic vinyl copolymer is SAN.

10. The thermoplastic composition of claim 8, wherein the mold release additives are each present in equal amounts.

11. The thermoplastic composition of claim 8, wherein the polycarbonate-polysiloxane copolymer is present in an amount from 4 to 8 wt. %, and wherein the aromatic vinyl copolymer is present in an amount of from 2 to 8 wt. %.

12. The thermoplastic composition of claim 8, further comprising a flame retardant additive.

13. An article comprising the composition of claim 8.

14. A thermoplastic composition comprising:
a polycarbonate, and
from 1.5 to 3 wt. % total, based on 100 wt. % of the polycarbonate, of a combination of at least three different mold release additives,
wherein a molded sample of the thermoplastic composition has lower ejection pressure from the mold compared to a sample of the same thermoplastic composition without the three mold release additives.

15. The thermoplastic composition of claim 14, wherein the mold release additives are each present in equal amounts.

16. An article comprising the thermoplastic composition of claim 14.

17. A thermoplastic composition comprising:
from 65 to 80 wt. % of a polycarbonate,
from 2 to 10 wt. % of a polycarbonate-polysiloxane copolymer,
from 15 to 25 wt. % an impact modifier composition comprising ABS or BABS and a second impact modifier different from BABS or ABS, and
from 1 to 10 wt. % of an aromatic vinyl copolymer,
wherein the thermoplastic composition, when molded and tested according to ISO 180 at −30° C., has a notched Izod impact of at least 40 kJ/m$^2$,
further comprising from 1.5 to 3 wt. % total, based on 100 wt. % of the composition excluding the mold release agents, of a combination of at least three different mold release additives.

18. The thermoplastic composition of claim 17, wherein the thermoplastic composition, when molded and tested according to ISO 180 at −30° C., has a notched Izod impact of at least 45 kJ/m.

19. The thermoplastic composition of claim 17, wherein the polycarbonate-polysiloxane copolymer is present in an amount from 4 to 8 wt. %, and wherein the aromatic vinyl copolymer is present in an amount of from 2 to 8 wt. %.

20. The thermoplastic composition of claim 17, wherein the second impact modifier is MBS and the aromatic vinyl copolymer is SAN.

21. The thermoplastic composition of claim 17, further comprising a flame retardant additive.

22. An article comprising the thermoplastic composition of claim 15.

* * * * *